US 12,545,291 B2

(12) United States Patent
Choi

(10) Patent No.: US 12,545,291 B2
(45) Date of Patent: Feb. 10, 2026

(54) VEHICLE MOTION PLANNER

(71) Applicant: Zoox, Inc., Foster City, CA (US)

(72) Inventor: Jiwung Choi, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 244 days.

(21) Appl. No.: 17/855,589

(22) Filed: Jun. 30, 2022

(65) Prior Publication Data

US 2024/0001959 A1 Jan. 4, 2024

(51) Int. Cl.
*B60W 60/00* (2020.01)
*B60W 30/095* (2012.01)
*B60W 40/04* (2006.01)
*B60W 40/072* (2012.01)
*G06N 3/084* (2023.01)

(52) U.S. Cl.
CPC .... *B60W 60/0011* (2020.02); *B60W 30/0956* (2013.01); *B60W 40/04* (2013.01); *B60W 40/072* (2013.01); *B60W 60/0013* (2020.02); *B60W 60/0015* (2020.02); *G06N 3/084* (2013.01); *B60W 2552/30* (2020.02);
(Continued)

(58) Field of Classification Search
CPC ......... B60W 60/0011; B60W 30/0956; B60W 40/04; B60W 40/072; B60W 60/0013; B60W 60/0015; B60W 2552/30; B60W 2554/40; B60W 2555/60; B60W 2556/40; B60W 60/00274; G06N 3/084; G01C 21/3446; G01C 21/3461; G01C 21/3492
See application file for complete search history.

(56) References Cited

U.S. PATENT DOCUMENTS 11,618,479 B2 * 4/2023 Kulkarni ......... B60W 60/00272
701/25
2018/0150081 A1 * 5/2018 Gross ................. G01C 21/3446
(Continued)

FOREIGN PATENT DOCUMENTS

WO     WO-2018094384 A1 * 5/2018 .............. A61B 5/01

OTHER PUBLICATIONS

David Sierra Gonzalez. "Towards Human-Like Prediction and Decision-Making for Automated Vehicles in Highway Scenarios". Artificial Intelligence [cs.AI]. Université Grenoble Alpes, 2019. (Year: 2019).*
(Continued)

*Primary Examiner* — Kyle J Kingsland
(74) *Attorney, Agent, or Firm* — Lee & Hayes, P.C.

(57) ABSTRACT

Techniques for controlling a vehicle are described herein. A system may receive a route to navigate from a start position to an end position in an environment. The system may receive map data based on the route and determine a lattice based on the map data. The lattice comprises nodes and connections therebetween. The nodes may represent various states of the vehicle. The connections may represent various feasible transitions between the nodes. The lattice may further comprise a set of connections representing a trajectory from the start position to the end position. The system may receive sensor data representing an object in the environment and determine a state of the object based on the sensor data. The system may modify, based on the object state and as an updated cost, a precomputed cost associated with the trajectory. The system may further control the vehicle based on the updated cost.

20 Claims, 8 Drawing Sheets

(52) U.S. Cl.
CPC ..... *B60W 2554/40* (2020.02); *B60W 2555/60* (2020.02); *B60W 2556/40* (2020.02)

(56) References Cited

U.S. PATENT DOCUMENTS

| | | | |
|---|---|---|---|
| 2018/0284785 A1* | 10/2018 | Berntorp | G08G 1/166 |
| 2020/0310453 A1* | 10/2020 | Takahashi | G05D 1/0223 |
| 2020/0377085 A1* | 12/2020 | Floyd-Jones | B60W 60/00276 |
| 2021/0020045 A1* | 1/2021 | Huang | G01C 21/3804 |
| 2021/0046924 A1* | 2/2021 | Caldwell | B60W 30/09 |
| 2021/0190519 A1* | 6/2021 | Blumentritt | G01C 21/3691 |
| 2021/0303920 A1* | 9/2021 | Das | G06V 10/764 |
| 2022/0057803 A1* | 2/2022 | Sorin | G05D 1/0214 |
| 2023/0341234 A1* | 10/2023 | Nister | B60W 60/001 |

OTHER PUBLICATIONS

Bender, et al., "The Combinatorial Aspect of Motion Planning: Maneuver Variants in Structured Environments," 2015 IEEE Intelligent Vehicles Symposium (IV), Jun. 2015, pp. 1386-1392.

Delaco, et al., "Learning a Lattice Planner Control Set for Autonomous Vehicles," arXiv:1903.02044v2 [cs.RO], Apr. 2019, 8 pages.

Hoey, et al., "Solving POMDPs with Continuous or Large Discrete Observation Spaces," IJCAI'05: Proceedings of the 19th International Joint Conference on Artificial Intelligence, Jul. 2005, pp. 1332-1338.

Koval, et al., "Configuration Lattices for Planar Contact Manipulation Under Uncertainty," arXiv:1605.00169 [cs.RO], Apr. 2016, 11 pages.

* cited by examiner

VEHICLE MOTION PLANNER

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle on the road, or the like. Perception systems utilize sensor data from sensors to detect one or more objects which enables the planning systems to predict one or more trajectories of the one or more objects. However, the complexity of such systems may increase the computational use, time, memory, and energy and, despite the complexity, may not be able to determine a solution for planning given a particular scenario.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
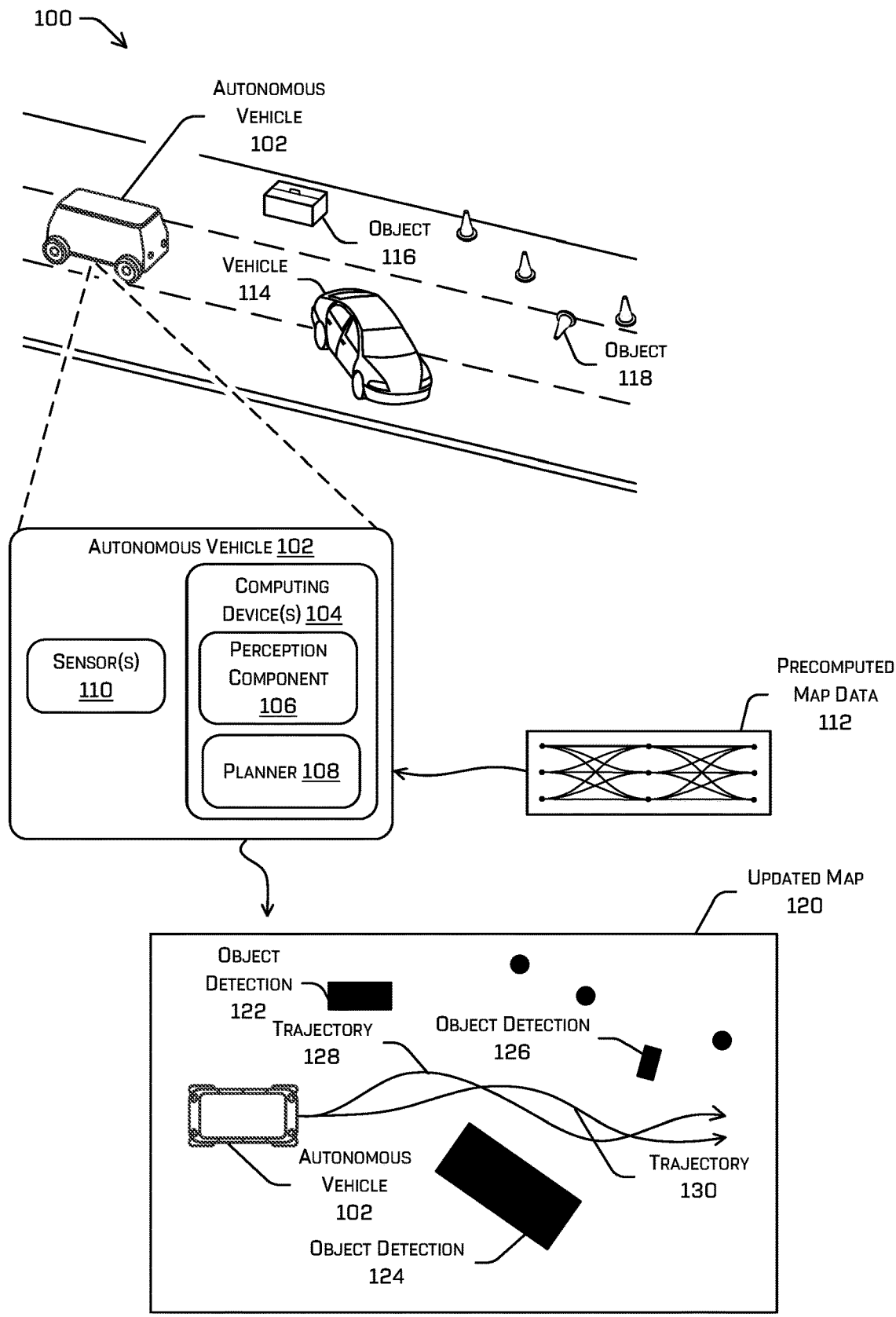
FIG. 1 illustrates a schematic diagram of an example environment, in which an autonomous vehicle may be controlled to traverse through the environment based at least in part on a lattice.

This disclosure is directed to techniques for generating a trajectory for controlling a vehicle, such as an autonomous vehicle, based at least in part on a lattice.

In some examples, a guidance system of an autonomous vehicle may receive route data associated with an environment. The route data may include a start position and an end position in the environment. For example, the guidance system may determine a current position of the autonomous vehicle (e.g., based at least in part on sensor data received from one or more sensor(s) of the autonomous vehicle, such as a global positioning sensor (GPS), lidar, radar, cameras, and the like), and receive an end location (e.g., which may be specified by a remote operator and/or a passenger). In various examples, such route data may indicate preferred routes to traverse an environment from a current location to a drop-off location for a passenger, a delivery address, etc.

The guidance system of the autonomous vehicle may receive, based on the route data, map data representing a portion of the environment along a route. In at least some examples, such map data may comprise indications of, for example, lane segments (e.g., finite segments of lanes), control policies (e.g., traffic control devices), and the like. The guidance system may further determine a lattice based at least in part on the map data. In at least some additional or alternative examples, the map data may comprise the lattice. The lattice may comprise a plurality of nodes and a plurality of connections between the plurality of nodes. In some examples, the plurality of nodes and/or the plurality of connections may be indicative of a state of the vehicle, including one or more of a position, orientation, heading, steering angle, velocity, angular rate, acceleration, or the like. For example, a first node of the plurality of nodes may be associated with a first state of the autonomous vehicle, and a second node of the plurality of nodes may be associated with a second state of the autonomous vehicle. The plurality of connections may represent various feasible transitions between the nodes. The lattice comprises a plurality of trajectories through the environment. For example, a set of connections of the plurality of connections may represent a kinematically feasible trajectory from the first node to the second node. In at least some examples, the nodes may be associated with a subset of the state of the vehicle. As a non-limiting example, a state may comprise a position, orientation, velocity, acceleration, etc., and the nodes may be associated with a position and/or orientation, though in additional or alternate examples, any and all parameters which define the state may be used.

In some examples, a trajectory of the plurality of trajectories included in the lattice may be associated with a precomputed cost. The precomputed cost associated with a trajectory may be determined based on one or more progression cost metrics and/or one or more comfort metrics. The progression cost metrics may include a number of lane changes associated with the trajectory, a time associated with the trajectory, a distance associated with the trajectory, a number of stop signs associated with the trajectory, etc. The comfort metrics may include jerk parameters associated with the trajectory, curvature parameters associated with the trajectory, pavement parameters associated with the trajectory, accelerations associated with the trajectory, etc.

In some examples, the first state of the autonomous vehicle may include position data of the first node in the environment and at least one or more acceleration data, velocity data, or yaw rate data associated with the autonomous vehicle. The second state of the autonomous vehicle may include position data of the second node in the environment. The guidance system of the autonomous vehicle may determine, based at least in part on the lattice, a kinematically feasible trajectory between the first node and the second node. As described above, the kinematically feasible trajectory between the first node and the second node may be associated with a precomputed cost.

In some examples, the guidance system of the autonomous vehicle may receive, from a sensor associated with the autonomous vehicle, sensor data representing one or more objects in the environment. For example, the autonomous vehicle may be equipped with various sensors for generating sensor data associated with the autonomous vehicle's surroundings to detect one or more objects. In another example, the guidance system may receive sensor data from one or more remote sensors mounted in an environment of the autonomous vehicle (e.g., sensors mounted in the environment, sensors on other vehicles, etc.). Such sensor data may indicate one or more objects in the environment.

In some examples, the lattice further includes bounding box (or other area indication) information of the autonomous vehicle associated with the first node, the second node, and the set of connections. As a non-limiting example of such, an area (e.g., determined based on a width of the vehicle traversing the various connections between nodes) may be precomputed and associated with the map. As such, computational resources may be preserved on vehicle by relying on precomputed areas. The guidance system may determine, based at least in part on the bounding box information, a collision probability of a collision between the autonomous vehicle and a detected object. In some examples, the precomputed cost associated with the kinematically feasible trajectory from the first node to the second node may be determined based at least in part on the collision probability.

In some examples, the guidance system may determine, based at least in part on the sensor data, an object state associated with the detected object. The guidance system may modify, based on the object state and as an updated cost, the precomputed cost associated with the kinematically feasible trajectory from the first node to the second node. The guidance system may further determine whether to utilize the kinematically feasible trajectory based on the updated cost and control the autonomous vehicle based at least in part on the kinematically feasible trajectory.

In some examples, the detected object includes a dynamic object (e.g., a moving vehicle). The guidance system may determine a connection of the set of connections based on the dynamic object, where the set of connections represents the kinematically feasible trajectory from the first node to the second node. The guidance system may determine, based on the object state associated with the dynamic object, a conditional cost of a plurality of conditional costs associated with the connection. The plurality of conditional costs may represent a plurality of collision probabilities associated with a plurality of trajectory of the dynamic object. For instance, the dynamic object may be associated with a potential straight-line trajectory, a potential left-turning trajectory, and a potential right-turning trajectory. A connection may be associated with a first conditional cost representing a precomputed collision probability associated with the straight-line trajectory of the dynamic object, a second conditional cost representing a precomputed collision probability associated with the left-turning trajectory of the dynamic object, and a third conditional cost representing a precomputed collision probability associated with the right-turning trajectory of the dynamic object. In any of the above examples, collisions may be determined based at least in part on a simplified model assuming constant velocity for the detected objects (whether proceeding straight, turning to the left, or turning to the right).

In some examples, the object includes a traffic control device (e.g., stop sign, yield sign, crosswalk, traffic light, speed limit sign, etc.). The guidance system may determine a connection of the set of connections based on the traffic control device, where the set of connections represents the kinematically feasible trajectory from the first node to the second node. The guidance system may determine, based on a state associated with the traffic control device, a conditional cost of a plurality of conditional costs associated with the connection. The plurality of conditional costs may represent a plurality of precomputed progress costs associated with a plurality of states (e.g., to reward trajectories which move toward the goal—destination). For instance, a traffic control device (e.g., a traffic light) may be associated with a red-light state and a green-light state. The connection may be associated with a first conditional cost representing a relatively high precomputed progress cost associated with the red-light state and a second conditional cost representing a relatively low precomputed progress cost associated with green-light state.

In some examples, the guidance system of the autonomous vehicle may modify one or more precomputed costs associated with one or more trajectories based at least in part on the detected object. For example, the guidance system may determine, based on the detected object and the lattice, a connection of the set of connections. The guidance system may determine, based on the object state associated with the object, a conditional cost of a plurality of conditional costs associated with the connection. The guidance system may determine, based on the lattice, a trajectory associated with the connection. The guidance system may further back-propagate, based at least in part on the conditional cost associated with the connection and as one or more updated costs, one or more precomputed costs associated with the trajectory in a direction towards the autonomous vehicle.

The techniques discussed herein may improve functioning of a computing device in a number of additional ways. In some examples, the use of lattice encoded with trajectories and precomputed costs associated with the trajectories to determine a trajectory for a vehicle improves the processing efficiency of the vehicle. For example, using the lattice may reduce the amount of processing and/or memory required for trajectory generation. Improved trajectory generation can further improve safety outcomes and can improve a rider experience (e.g., by reducing occurrences of emergency braking, swerving, and the like). These and other potential improvements to the functioning of the computing device are discussed herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. For example, the techniques described herein may be implemented with semi-autonomous vehicles. In another example, the techniques may be utilized in an aviation or nautical context, or in any system navigating through an environment using routes or trajectories. In one example, similar techniques may be utilized in driver-controlled vehicles in which such a system may provide an indication of whether it is safe to perform various maneuvers.

FIG. 1 illustrates a schematic diagram of an example environment 100, in which an autonomous vehicle 102 may be controlled to traverse through the environment based at least in part on a lattice. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to pathfinding in video games, manufacturing, augmented reality, etc.

The autonomous vehicle 102 may comprise computing device(s) 104 that may include one or more machine-learned (ML) models and/or the guidance system discussed herein. For example, the computing device(s) 104 may comprise a perception component 106 and/or a planner 108, which may comprise one or more ML models and may be parts of the guidance system discussed herein. For example, the perception component 106 and/or the planner 108 may comprise the hardware and/or software for conducting the operations discussed herein related to a guidance system associated with the autonomous vehicle 102. The guidance system may comprise more or fewer components, but the perception component 106 and/or planner 108 are given as a non-limiting example.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure.

In some examples, the guidance system discussed herein and/or an ML model may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In some examples, the guidance system may receive a route to navigate from a start position to an end position in the environment 100 and receive precomputed map data 112 representing a portion of the environment 100 based on the route. For example, the planner 108 may have determined a portion of the environment 100 based at least in part on sensor data indicating a current position of the autonomous vehicle 102 (e.g., based at least in part on sensor data received from one or more sensor(s) of the autonomous vehicle, such as a global positioning sensor (GPS), lidar, radar, cameras, and the like), and an end position received as part of a mission (e.g., from a passenger, from a command center). The planner 108 may further receive the precomputed map data 112 representing the portion of the environment. As used herein, references to a "position" may comprise both a location and/or a pose (e.g., position and/or orientation/heading of the autonomous vehicle).

The precomputed map data 112 may include a lattice comprising a plurality of nodes and a plurality of connections between the plurality of nodes. The plurality of nodes and/or the plurality of connections may represent various states of the autonomous vehicle 102. For example, the plurality of nodes may include a first node associated with a first state of the autonomous vehicle 102 and a second node associated with a second state of the autonomous vehicle 102. The plurality of connections may represent various feasible transitions between the plurality of nodes. In some examples, a set of connections of the plurality of connections may represent a kinematically feasible trajectory from the first node to the second node. The kinematically feasible trajectory from the first node to the second node may be associated with a precomputed cost (e.g., based on comfort metrics, energy required to compute the maneuver, divergence from a straight line, etc.). The precomputed map data 112 may further include a plurality of trajectories through the environment 100.

In some examples, the first node may be associated with the start position of the autonomous vehicle 102 in the environment 100, and the second node may be associated with the end position of the autonomous vehicle 102 in the environment 100 and/or an intermediate position determined based at least on some horizon (e.g., an amount of time or a distance to be traversed). The guidance system discussed herein may receive the first state of the autonomous vehicle 102 from one or more sensor(s) 110 associated with the autonomous vehicle 102. The first state of the autonomous vehicle 102 may include position data of the first node in the environment 100 and one or more acceleration data associated with the autonomous vehicle 102, velocity data associated with the autonomous vehicle 102, and/or yaw rate data associated with the autonomous vehicle 102. For example, the planner 108 may receive sensor data from the sensor(s) 110 of the autonomous vehicle 102. The sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc. The guidance system may further receive the second state of the autonomous vehicle 102 as part of a mission (e.g., from a passenger, from a command center). The second state for the autonomous vehicle 102 may include position data of the second node in the environment 100.

In some examples, as the autonomous vehicle 102 operates from the start position to reach the end position, the guidance system may receive sensor data from a sensor associated with the autonomous vehicle 102. For example, the guidance system discussed herein may receive sensor data from sensor(s) 110 of the autonomous vehicle 102. The guidance system may further detect a variety of objects (e.g., a blocking vehicle 114, an object 116, and a fallen traffic cone 118) that impedes operations of the autonomous vehicle 102 in the environment 100 based on sensor data.

In some examples, the guidance system may generate an updated map 120 based on the precomputed map data 112 and the detected objects. For example, the perception component 106 may include one or more ML models and/or other computer-executable instructions for detecting, identifying, segmenting, classifying, and/or tracking one or more objects based on the sensor data collected from sensor(s) 110 of the autonomous vehicle 102. The guidance system may further generate the updated map 120 based on the precomputed map data 112 and the detected objects. For example, the updated map 120 depicted in FIG. 1 may include a first portion indicated as being occupied and corresponding to an object detection 122 generated by the perception component 106 associated with the object 116. Similarly, other portions of the updated map 120 indicated as being occupied may correspond with an object detection 124 associated with the blocking vehicle 114 and an object detection 126 associated with the fallen traffic cone 118 (and the other traffic cones which are not numerated for clarity), otherwise the updated map 120 indicates the rest of the environment (within the bounds of the updated map 120) as being free space.

In some examples, the updated map 120 may include one or more trajectories that do not interfere with the detected objects. In some examples, generating the updated map 120 based on the precomputed map data 112 and the detected objects includes pruning or adjusting costs associated with trajectories that interfere with the detected objects. In the particular example shown in FIG. 1, the guidance system may determine, based at least in part on the detected objects 114-118 and the precomputed map data 112, two trajectories 128 and 130 that do not interfere or intersect with the object detections 122-126. However, in various examples, the guidance system may determine a lesser or greater number of trajectories (and associated precomputed areas associated with the vehicle) that do not interfere or intersect with the object detections 122-126 and/or associated trajectories of the object.

In some examples, the updated map 120 may further include precomputed costs associated with the one or more trajectories that do not interfere with the detected objects. For example, the trajectory 128 may be associated with a first precomputed cost, and the trajectory 130 may be associated with a second precomputed cost. A precomputed cost associated with a trajectory may be determined based on one or more progression cost metrics, one or more comfort metrics, divergence from rules of the road, an amount of energy required to perform the maneuver, and the like. The progression cost metrics may include a number of lane changes associated with the trajectory, a time associated with the trajectory, a distance associated with the trajectory, a number of stop signs associated with the trajectory, etc. The comfort metrics may include jerk parameters associated with the trajectory, curvature parameters associated with the trajectory, pavement parameters associated with the trajectory, accelerations associated with the trajectory, etc. so as to yield vehicle behavior which is pleasing to a passenger.

In some examples, the guidance system may determine, based at least in part on the sensor data, an object state associated with a detected object. The guidance system may further modify, based on the object state and as updated costs, precomputed costs associated with the one or more trajectories that do not interfere or intersect with the detected objects. For example, the guidance system may modify the first precomputed cost associated with the trajectory 128 as a first updated cost and modify the second precomputed cost associated with the trajectory 130 as a second updated cost.

The guidance system may further determine, based at least in part on the updated cost, whether to utilize a trajectory. For example, the guidance system may compare the first cost updated associated with the trajectory 128 with the second cost updated associated with the trajectory 130. If the guidance system determines the first updated cost is greater than the second updated cost, the guidance system may control the autonomous vehicle 102 to traverse through the environment 100 based on the trajectory 130. If the guidance system determines the first updated cost is less than the second updated cost, the guidance system may control the autonomous vehicle 102 to traverse through the environment 100 based on the trajectory 128. The guidance system may further control the autonomous vehicle 102 based at least in part on the trajectory. In at least some examples, the trajectory determined by the guidance system may be further refined (e.g., perturbed, optimized, or otherwise modified from the precomputed trajectory) to provide an optimal solution to traversal.

Figure 2:
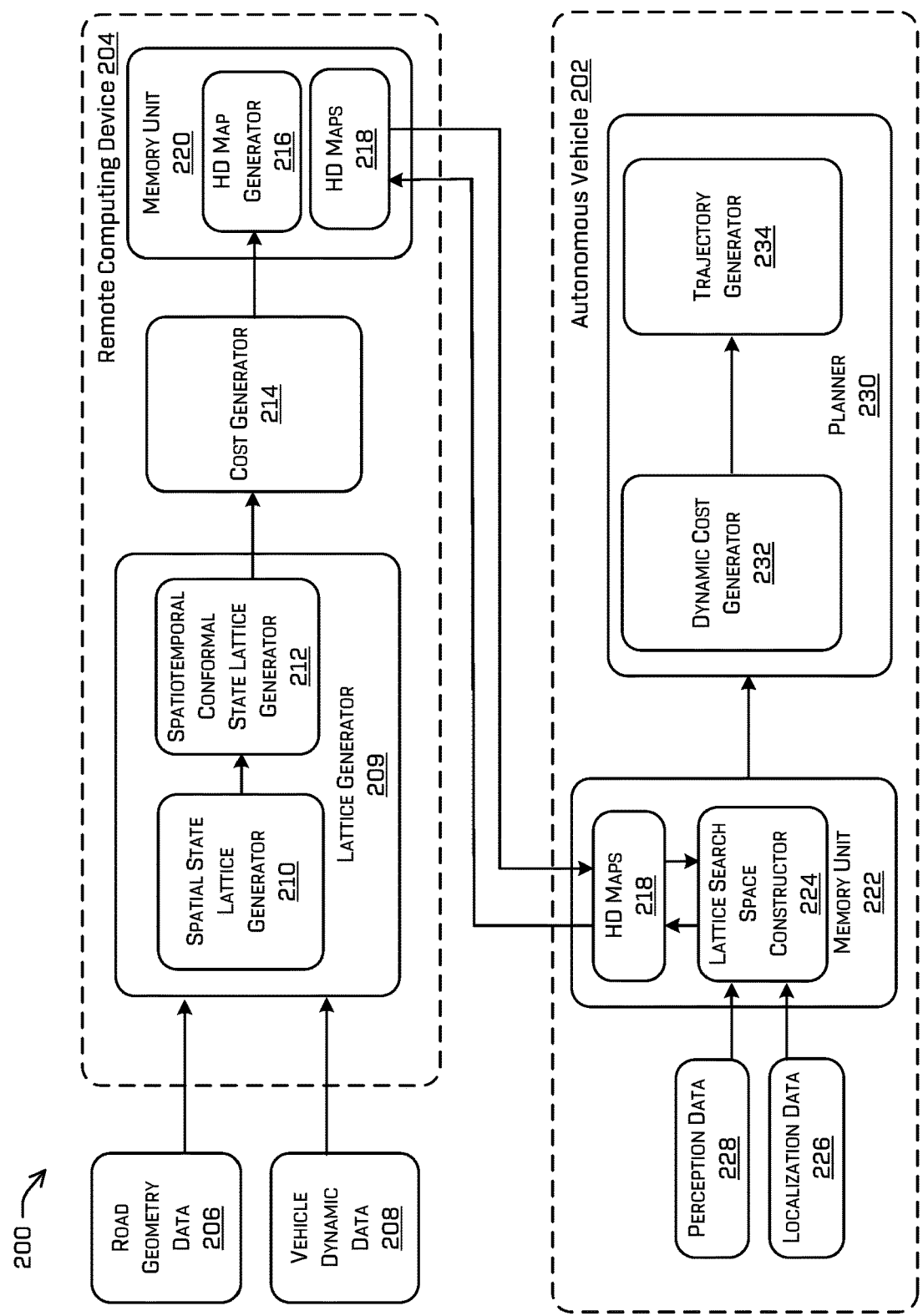
FIG. 2 illustrates a block diagram of an example architecture for generating a trajectory for controlling an autonomous vehicle based at least in part on a lattice.

FIG. 2 illustrates a block diagram of an example architecture 200 for generating a trajectory for controlling an autonomous vehicle based at least in part on a lattice. FIG. 2 is shown at a high-level to allow for clarity and ease of understanding. FIG. 2 includes an autonomous vehicle 202 and a remote computing device 204.

In some examples, a lattice generator 209 of the remote computing device 204 may receive road geometry data 206 and vehicle dynamic data 208 and generate one or more lattices to navigate a vehicle (e.g., the autonomous vehicle 202) through an environment. In some examples, the road geometry data 206 may include map elements such as lane marking, lane boundaries, one or more lane references (e.g., a centerline associated with a lane and/or a route between available (e.g., legal) lanes). Additional examples of map elements can include, but are not limited to, one or more of a lane element, a bike lane element, a bus lane element, a crosswalk element, a junction (e.g., intersection) element, a railroad crossing element, a fire lane element, a lane divider element, a traffic light element, a stop sign element, a stop line element, a yield sign element, a yield line element, a parking lane element, a driveway or parking lot entrance element, a speed bump element, jaywalking regions (e.g., a virtual crosswalk), trajectory waypoints (e.g., known trajectories), passenger pick up points, a sign location element, a geofence element, construction zone element (e.g., for long-standing or non-temporary construction zones), and the like. In some examples, the vehicle dynamic data 208 may include acceleration data associated with the vehicle, velocity data associated with the vehicle, yaw data, yaw rate data associated with the vehicle, suspension data associated with the vehicle, tire dynamics, throttle dynamics, steering dynamics (e.g., max steering angle, steering ratio, etc.), vehicle mass, the moment of inertia, the distance between the front and rear axle, etc.

A lattice may comprise a plurality of nodes and a plurality of connections between the plurality of nodes. In some examples, the plurality of nodes and/or the plurality of connections may be indicative of a state (or subset of a state) of the autonomous vehicle 202, including one or more of a position, orientation, heading, steering angle, velocity, angular rate, acceleration, or the like. For example, a first node of the plurality of nodes may be associated with a first state of the autonomous vehicle 202, and a second node of the plurality of nodes may be associated with a second state of the autonomous vehicle 202. The plurality of connections may represent various feasible transitions between the nodes. A set of connections of the plurality of connections may represent a kinematically feasible trajectory between the first node and the second node. The lattice may further include a plurality of trajectories to navigate the autonomous vehicle 202 through the environment.

In some examples, the lattice may include one or more layers, where a number of cells of the lattice cover a region in front of the autonomous vehicle 202. A layer may comprise one or more nodes, which may be organized according to a structure (e.g., a line, a vector specifying a shape and/or density). The number of nodes in a layer may be predefined based at least in part on a density (e.g., m nodes per meter of a layer), which may correspond to a maximum target accuracy of the path generated by the guidance system (e.g., the maximum particularity with which the path could be specified). In some examples, the layers of the lattice may be spaced along the route according to a predefined density (e.g., p layers per meter of the route) and/or the structure of a layer may lie orthogonally to the route. In some examples, a density of the layers (spaced longitudinally to the route) may differ from a density of the nodes of the layers (spaced laterally to the route). In an additional or alternate example, the nodes may be irregularly spaced (e.g., according to a random generation of node locations) in addition to or instead of being regularly spaced, as described above.

In some examples, the lattice generator 209 may include a spatial state lattice generator 210 and a spatiotemporal conformal state lattice generator 212. The spatial state lattice generator 210 may generate, based on the road geometry data 206 and the vehicle dynamic data 208, one or more spatial state lattices. A spatial state lattice is a search graph where a plurality of nodes representing physical locations of the autonomous vehicle 202 are connected by a plurality of connections representing trajectory segments. In some examples, a spatiotemporal conformal state lattice generator 212 may receive the one or more spatial state lattices from the spatial state lattice generator 210 and generate one or more spatiotemporal conformal state lattices. A spatiotemporal conformal state lattice can be a search graph where a plurality of nodes representing kinematic constraints of the autonomous vehicle 202 are connected by a plurality of connections representing trajectory segments that satisfy the kinematic constraints of the autonomous vehicle 202. The kinematic constraints of the autonomous vehicle 202 may be determined based on the vehicle dynamic data 208. In some examples, kinematic constraints can be associated with particular connection segments such that a particular vehicle state at a node may be based on the connection used to arrive at that node.

In some examples, a cost generator 214 may generate cost data representing a plurality of precomputed costs associated with a plurality of trajectories included in the lattice. In some examples, a precomputed cost associated with a trajectory may be determined based on one or more progression cost metrics, one or more comfort metrics, metrics regarding the rules of the road, costs which penalize energy consumption, and the like. The progression cost metrics may include a number of lane changes associated with the trajectory, a time associated with the trajectory, a distance associated with the trajectory, a number of stop signs associated with the trajectory, etc. The comfort metrics may include jerk parameters associated with the trajectory, curvature parameters associated with the trajectory, pavement parameters associated with the trajectory, accelerations associated with the trajectory, etc.

As described above, a kinematically feasible trajectory between a first node of the plurality of nodes and a second node of the plurality of nodes may include a set of connections. In some examples, a connection may be associated with a plurality of conditional costs.

In some examples, the plurality of conditional costs associated with the connection may represent a plurality of collision probabilities associated with a plurality of trajectories of a dynamic object (e.g., a moving vehicle). For instance, a dynamic object may be associated with a potential straight-line trajectory, a potential left-turning trajectory, and a potential right-turning trajectory. In any such assumption, a simple kinematic model in which all objects move at a constant velocity (whether along a straight line or turning) may be used. In other examples, one or more predicted trajectories of the objects from a prediction system may be used. A connection may be associated with a first conditional cost representing a precomputed collision probability associated with the straight-line trajectory, a second conditional cost representing a precomputed collision probability associated with the left-turning trajectory, and a third conditional cost representing a precomputed collision probability associated with the right-turning trajectory.

Additionally or alternatively, in some examples, the plurality of conditional costs associated with a connection may represent a plurality of precomputed progress costs associated with a plurality of states (e.g., traffic signals). For instance, a traffic control device (e.g., a traffic light) may be associated with a red-light state and a green-light state. The connection may be associated with a first conditional cost representing a relatively high precomputed progress cost associated with the red-light state and a second conditional cost representing a relatively low precomputed progress cost associated with green-light state.

In some examples, a high-definition (HD) map generator 216 may receive one or more lattices and the cost data associated with the plurality of trajectories in each lattice and generate one or more HD maps 218. A HD map 218 can be a search graph where the HD map comprises a lattice, and trajectories in the lattice are associated with precomputed costs. The one or more HD maps 218 may be stored in a memory unit 220 of the remote computing device 204.

In some examples, the autonomous vehicle 202 may receive the one or more HD maps 218 from the remote computing device 204 and store the one or more HD maps 218 in a memory unit 222 of the autonomous vehicle 202.

In some examples, the autonomous vehicle 202 may receive a route to navigate from a start position to an end position in an environment. In some examples, the start position may be determined based on localization data 226, which may be received from one or more sensor(s) of the autonomous vehicle 202, such as a global positioning sensor (GPS), lidar, radar, cameras, and the like. In some examples, the end position may be received as part of a mission (e.g., from a passenger, from a command center).

The autonomous vehicle 202 may further receive, based on the route, map data representing a portion of the environment along the route. For example, the autonomous vehicle 202 may receive map data with lattice layer based on the start position and the end position.

As the autonomous vehicle 202 traverses from the start position to the end position through the environment, the autonomous vehicle 202 may receive perception data 228 representing one or more objects detected by autonomous vehicle 202. The perception data 228 may be received from one or more sensor(s) of the autonomous vehicle 202, such as cameras or other image sensors, ultrasonic sensors to acoustically detect one or more objects in the environment, lidar sensors, radar sensors, etc.

A lattice search space constructor 224 of the autonomous vehicle 202 may receive the localization data 226, the perception data 228, and the map of the one or more HD maps 218 determined based on the localization data 226, and update the map based on the localization data 226 and/or the perception data 228 (e.g., by matching a current state of the autonomous vehicle 202 and objects onto a lattice). The autonomous vehicle 202 may further transmit the updated map to the remote computing device 204 and store the updated map in the memory unit 220 of the remote computing device 204.

The lattice search space constructor 224 may generate, based on the lattice and the one or more detected objects, a set of trajectories of a plurality of trajectories included in the lattice. In some examples, generating the set of trajectories includes changing conditional costs associated with various trajectories that interfere or intersect with the one or more detected objects and/or pruning trajectories. For example, the lattice search space constructor 224 may determine, based at least in part on the lattice and the detected objects, a set of trajectories of the plurality of trajectories that do not interfere with the one or more detected objects. Each trajectory of the set of trajectories includes a set of connections and is associated with a precomputed cost. Each trajectory of the set of trajectories may enable the autonomous vehicle 202 to traverse from the start position to the end position through the environment while avoiding the one or more detected objects.

A planner 230 of the autonomous vehicle 202 may determine a trajectory based on the lattice and the one or more detected objects and control the autonomous vehicle 202 from the start position to the end position based at least in part on the trajectory. In some examples, the planner 230 includes a dynamic cost generator 232 and a trajectory generator 234.

The dynamic cost generator 232 may modify, based at least in part on the sensor data and as an updated cost, a precomputed cost associated with a trajectory. For example, the dynamic cost generator 232 may determine, based at least in part on the sensor data, an object state associated with an object. The dynamic cost generator 232 may modify, based on the object state and as an updated cost, a precomputed cost associated with a kinematically feasible trajectory from the start position to the end position through the environment.

In some examples, the object includes a dynamic object (e.g., a moving vehicle, a pedestrian, a bicyclist, etc.). The dynamic cost generator 232 may determine a connection of a set of connections based on the dynamic object, where the set of connections represents a kinematically feasible trajectory from the start position (e.g., a first node) to the end position (e.g., a second node). The dynamic cost generator 232 may determine, based on the object state associated with the dynamic object, a conditional cost of a plurality of conditional costs associated with the connection. The plurality of conditional costs may represent a plurality of collision probabilities associated with a plurality of trajectory of the dynamic object. The dynamic cost generator 232 may further modify, based on the conditional cost, the precomputed cost associated with the trajectory.

In some examples, the object includes a traffic control device. The dynamic cost generator 232 may determine a connection of a set of connections based on the traffic control device, where the set of connections represents a kinematically feasible trajectory from the start position (e.g., a first node) to the end position (e.g., a second node). The dynamic cost generator 232 may determine, based on a state associated with the traffic control device, a conditional cost of a plurality of conditional costs associated with the connection. The plurality of conditional costs may represent a plurality of progress costs associated with a plurality of states. The dynamic cost generator 232 may further modify, based on the conditional cost, the precomputed cost associated with the trajectory.

The planner 230 may further determine whether to utilize a trajectory based on updated costs. For example, the trajectory generator 234 of the autonomous vehicle 202 may select a trajectory from a set of trajectories based on the updated costs. For example, the trajectory generator 234 may select a trajectory associated with the lowest updated cost and may control the autonomous vehicle 202 to traverse from the start position to the end position through the environment based at least in part on the selected trajectory. In at least some examples, the trajectory may be further refined, or otherwise optimized, from the precomputed trajectory associated with the lattice.

Figure 3:
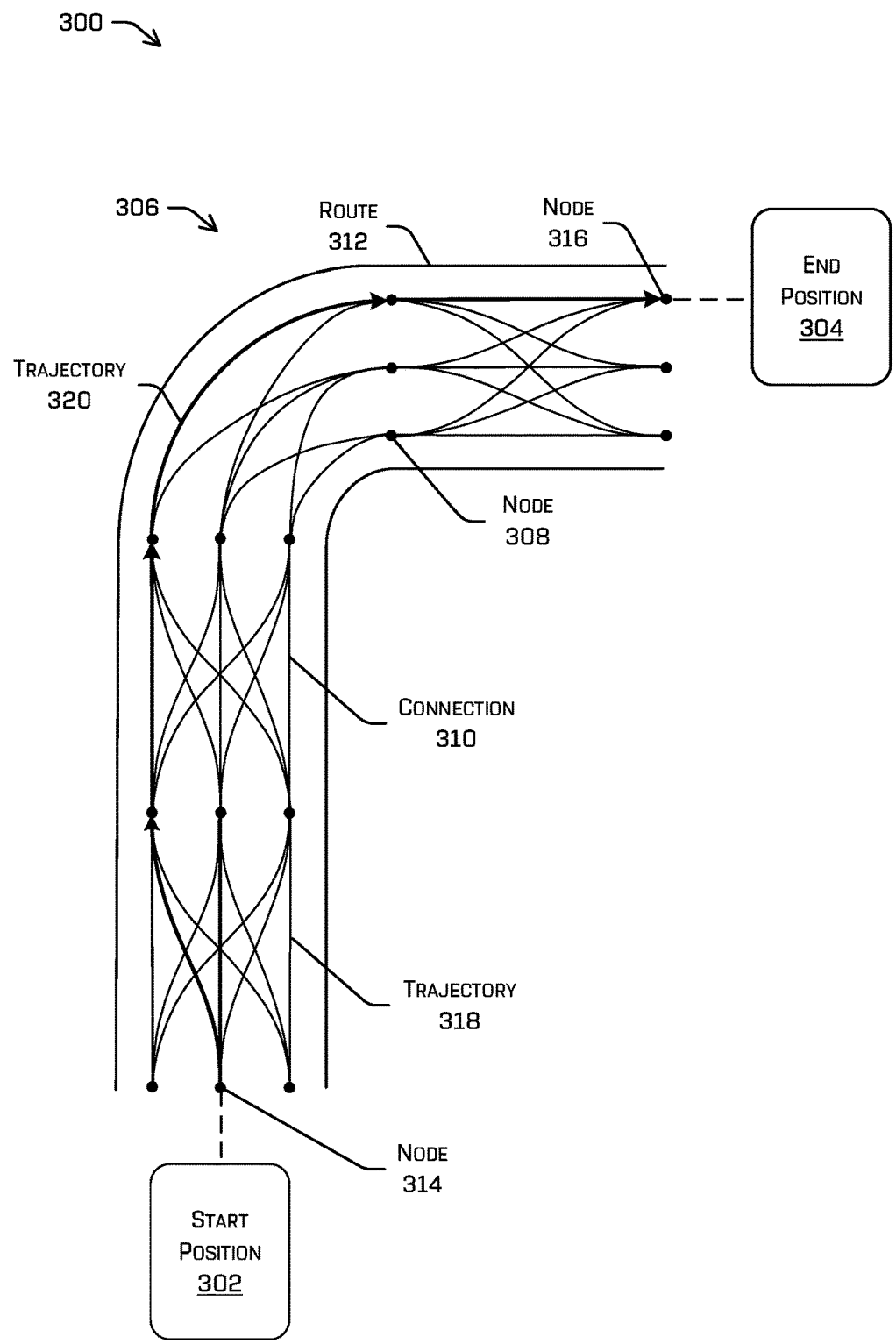
FIG. 3 illustrates an example trajectory generated by searching a (sampled) lattice.

FIG. 3 illustrates an example trajectory generated by searching an example lattice 300. The example lattice 300 may be determined based at least in part on a start position 302 and an end position 304 in an environment. For example, a guidance system of a vehicle (e.g., autonomous vehicle 102 or autonomous vehicle 202) may receive sensor data indicating a current position of the vehicle (e.g., based at least in part on sensor data received from one or more sensor(s) of the vehicle, such as a global positioning sensor (GPS), lidar, radar, cameras, and the like), and an end position received as part of a mission (e.g., from a passenger, from a command center). The guidance system of the vehicle may further receive, based on the start position and the end position, the lattice 300 representing a portion of the environment.

In some examples, the lattice 300 may comprise one or more layers. In the particular example shown in FIG. 3, the lattice 300 includes a single layer 306. However, in various examples, the lattice 300 may include two or more layers. Each layer of the one or more layers, such as the layer 306, may comprise a plurality of nodes 308 and a plurality of connections 310 between the plurality of nodes 308. Nodes are depicted as small dots in FIG. 3, such as nodes 308 of the lattice 300; however, it is understood that the nodes discussed herein may be a vertex of a lattice and/or a portion of the lattice, such as an area identified by a cell. Similarly, connections between the nodes are depicted as solid lines in FIG. 3, such as connections 310 of the lattice 300; however, it is understood that the connections between the nodes discussed herein may be represented by any suitable symbols, such as dashed lines.

As illustrated in FIG. 3, the lattice 300 may include the plurality of nodes 308 that are distributed along a route 312 determined at least based in part on the start position 302 and the end position 304. In the particular example of FIG. 3, the nodes 308 are spaced evenly along the route 312. It is understood that the plurality of nodes 308 may be otherwise distributed along the route 312 (e.g., randomly distributed within boundaries that are based at least in part on the route 312). In some examples, the plurality of nodes 308 of the lattice 300 may have been sampled based at least in part on a sampling rate that specifies a minimum and/or maximum spacing between sample nodes, a density of nodes, and/or the like. In some examples, the number of the nodes 308 or the density of the nodes 308 of the lattice 300 may be dynamically determined. For example, the number of the nodes 308 or the density of the nodes 308 may be determined based on a velocity associated with a vehicle. Alternatively, the number of the nodes 308 or the density of the nodes 308 may be predefined by a user of the vehicle or a third party.

The lattice 300 may include a node 314 that is associated with a first state of a vehicle and a node 316 that is associated with a second state of the vehicle. State of the vehicle may include, but are not limited to, pose data (e.g., x-, y-, and z-positions, yaw, pitch, roll, etc.), acceleration data, velocity data, or yaw rate data associated with the vehicle. In some examples, the node 314 may be determined based on the start position 302, and the node 316 may be determined based on the end position 304. In some examples, the node 314 and the node 316 may further be determined based on the acceleration data, the velocity data, or the yaw rate data associated with the vehicle.

The lattice 300 may include a plurality of trajectories 318 through the environment defined by connections between a plurality of nodes. Such nodes may be equally spaced along lane segments associated with a map of the environment. A set of trajectories of the plurality of trajectories 318 represent feasible transitions between the node 314 and the node 316. Each trajectory of the set of trajectories is associated with a precomputed cost. As described above, a precomputed cost associated with a trajectory may be determined based on one or more progression cost metrics and/or one or more comfort metrics. The progression cost metrics may include a number of lane changes associated with the trajectory, a time associated with the trajectory, a distance associated with the trajectory, a number of stop signs associated with the trajectory, etc. The comfort metrics may include jerk parameters associated with the trajectory, curvature parameters associated with the trajectory, pavement parameters associated with the trajectory, accelerations associated with the trajectory, etc.

A trajectory 320 representing a feasible transition between the node 314 and the node 316 may include a set of connections. In some examples, a connection of the set of connections may be associated with a plurality of conditional costs. In some examples, the plurality of conditional costs associated with the connection may represent a plurality of collision probabilities associated with a plurality of trajectories of a dynamic object (e.g., a moving vehicle). Additionally, or alternatively, in some examples, the plurality of conditional costs associated with the connection may represent a plurality of precomputed progress costs associated with a plurality of states (e.g., traffic signals).

In some examples, the guidance system of the vehicle may receive, from a sensor associated with the vehicle, sensor data representing an object in the environment. The guidance system may further determine, based on the object, a connection of the set of connections. For example, the guidance system may determine, based on a position of the object, the connection of the set of connections.

In some examples, the guidance system of the vehicle may determine, based on an object state associated with the object, a conditional cost of a plurality of conditional costs associated with the connection. The guidance system of the vehicle may further modify, based on the conditional cost and as an updated cost, a precomputed cost associated with the trajectory. The guidance system may further determine whether to utilize the trajectory 320 based on the updated cost and control the autonomous vehicle based at least in part on the trajectory 320.

Figure 4:
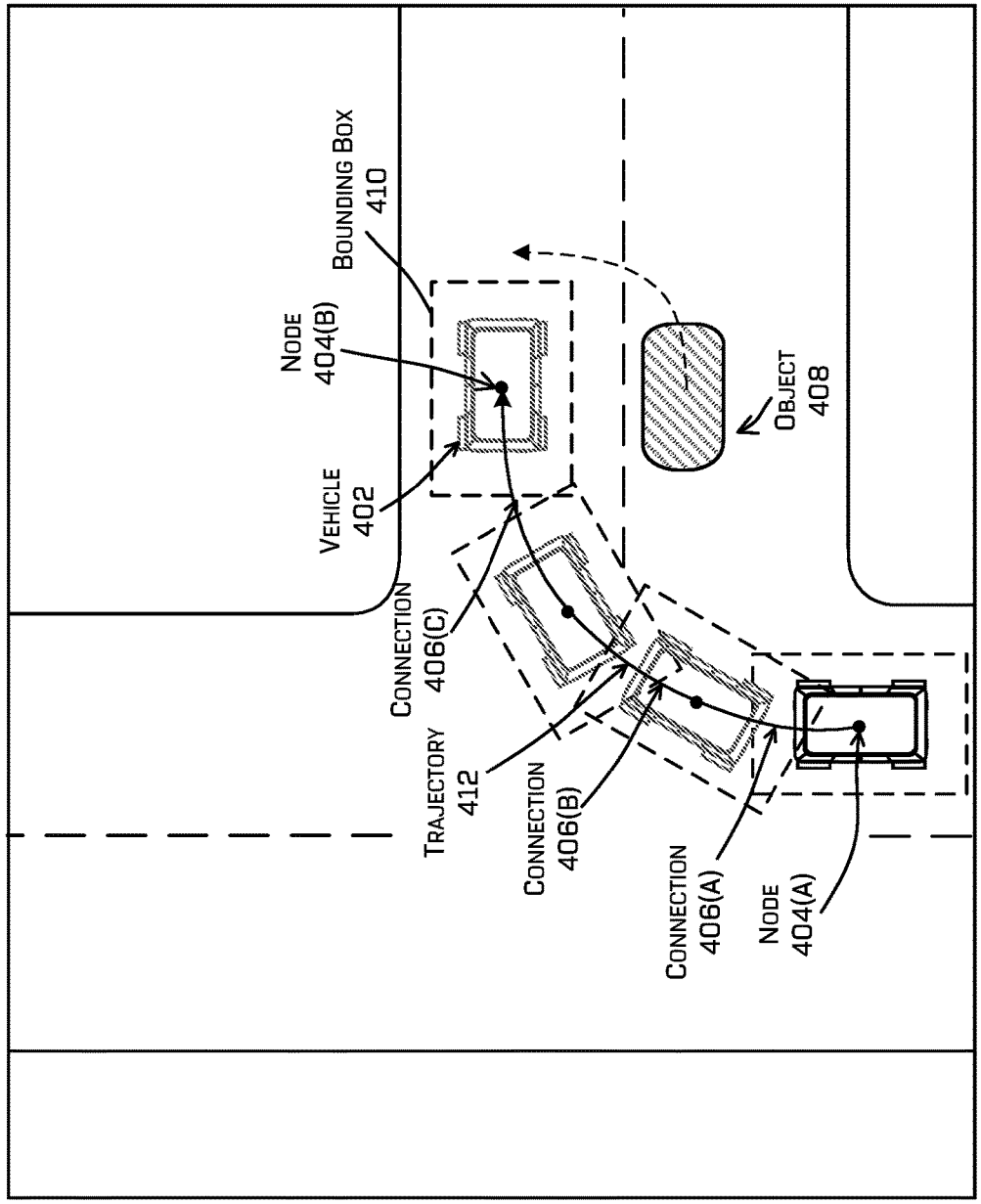
FIG. 4 illustrates an example environment, in which an autonomous vehicle generates an example swath trajectory based at least in part on a lattice and updates a precomputed cost associated with the trajectory based on a conditional cost associated with a connection in the lattice.

FIG. 4 illustrates an example environment 400, in which an autonomous vehicle 402 generates an example swath trajectory 410 based at least in part on a lattice and updates a precomputed cost associated with the trajectory 410 based on a conditional cost associated with a connection in the lattice.

As depicted in FIG. 4, the vehicle 402 may operate in the environment 400, and a guidance system of the autonomous vehicle 402 may receive a start position and an end position in the environment 400. The guidance system of the autonomous vehicle 402 may receive, based on the start position and the end position, map data representing a portion of the environment 400. The map data may include a lattice (not shown in FIG. 4) comprising a plurality of nodes 404 and a plurality of connections 406 between the plurality of nodes 404. A node 404(A) of the plurality of nodes 404 may be associated with a first state of the autonomous vehicle 402, and a node 404(B) of the plurality of nodes 404 may be associated with a second state of the autonomous vehicle 402. The lattice may include a plurality of trajectories through the environment 400 (not shown in FIG. 4). A set of trajectories of the plurality of trajectories may represent feasible transitions between the node 404(A) and the node 404(B).

In some examples, the guidance system of the autonomous vehicle 402 may receive from a sensor associated with the autonomous vehicle 402, sensor data representing an object 408 in the environment 400. In at least one example, the autonomous vehicle 402 can include one or more sensor systems to detect the object 408 in the environment 400 and/or the surroundings of the autonomous vehicle 402. By way of example and not limitation, the sensor system(s) can include one or more cameras or other image sensors, ultrasonic sensors to acoustically detect objects in the environment 400, lidar sensors, radar sensors, etc. For example, the guidance system of the autonomous vehicle 402 may identify one or more dynamic and/or static objects, such as a vehicle with a protruding object, a traffic cone, a hazard road sign, fencing, a double-parked vehicle, or the like.

The guidance system of the autonomous vehicle 402 may determine, based at least in part on the object 408 and the lattice included in the map data, a set of trajectories of the plurality of trajectories that do not interfere with the object 408 (not shown in FIG. 4). Each trajectory of the set of trajectories can be associated with a precomputed cost. Each trajectory of the set of trajectories may enable the autonomous vehicle 402 to traverse from the start position to the end position through the environment while avoiding the object 408. In the particular example shown in FIG. 4, the guidance system may determine, based at least in part on the object 408 and the lattice, a trajectory 412 that does not interfere with the object 408.

Each trajectory of the set of trajectories may include a set of connections and a precomputed cost. In the particular example shown in FIG. 4, the trajectory 412 includes connections 406(A), 406(B), and 406(C). The precomputed cost associated with the trajectory 412 may be determined based on one or more progression cost metrics and/or one or more comfort metrics. The progression cost metrics may include a number of lane changes associated with the trajectory, a time associated with the trajectory, a distance associated with the trajectory, a number of stop signs associated with the trajectory, etc. The comfort metrics may include jerk parameters associated with the trajectory, curvature parameters associated with the trajectory, pavement parameters associated with the trajectory, accelerations associated with the trajectory, etc.

In some examples, the precomputed cost associated with the trajectory 412 may further be determined based at least in part on a collision probability. The collision probability represents a probability of a collision between the autonomous vehicle 402 and the object 408. The collision probability may be determined based on bounding box information of the autonomous vehicle 402. For example, the lattice may include bounding box information of the autonomous vehicle 402 associated with the node 404(A), the node 404(B), and the plurality of connections 406. The bounding box information of the vehicle 402 may indicate the size and/or shape of the autonomous vehicle 402 (e.g., dimensions, such as one or more lengths, widths, and/or heights associated with the autonomous vehicle 402). The guidance system of the autonomous vehicle 402 may determine, based at least in part on the bounding box information, the collision probability associated with the trajectory 412. The precomputed cost associated with the trajectory 412 may be determined based at least in part on the collision probability. For example, a trajectory associated with a relatively high collision probability may be assigned with a relatively high precomputed cost compared to a trajectory associated with a relatively low collision probability.

In some examples, the guidance system of the autonomous vehicle 402 may determine, based on a position of the object 408, connection 406 (C) of the connections 406. The connection 406 (C) may be associated with one or more conditional costs. The guidance system of the autonomous vehicle 402 may determine, based on the object state associated with the object 408, a conditional cost of the one or more conditional costs associated with the connection 406 (C).

In the particular example shown in FIG. 4, the object 408 is a dynamic object (e.g., a moving vehicle). The plurality of conditional costs associated with the connection 406(C) may include a first conditional cost associated with a left-turning trajectory and a second conditional cost associated with a right-turning trajectory. The object state associated with the object 408 may include a light indication associated with the object 408. The guidance system of the autonomous vehicle 402 may determine, based on the sensor data, that the object state associated with the object 408 is a light indication indicating a left turn of the object 408. The guidance system of the autonomous vehicle 402 may select, based on the object state, the first conditional cost associated with the left-turning trajectory. The guidance system may further modify, based on the first conditional cost and as an updated cost, the precomputed cost associated with the trajectory 412.

Figure 5:
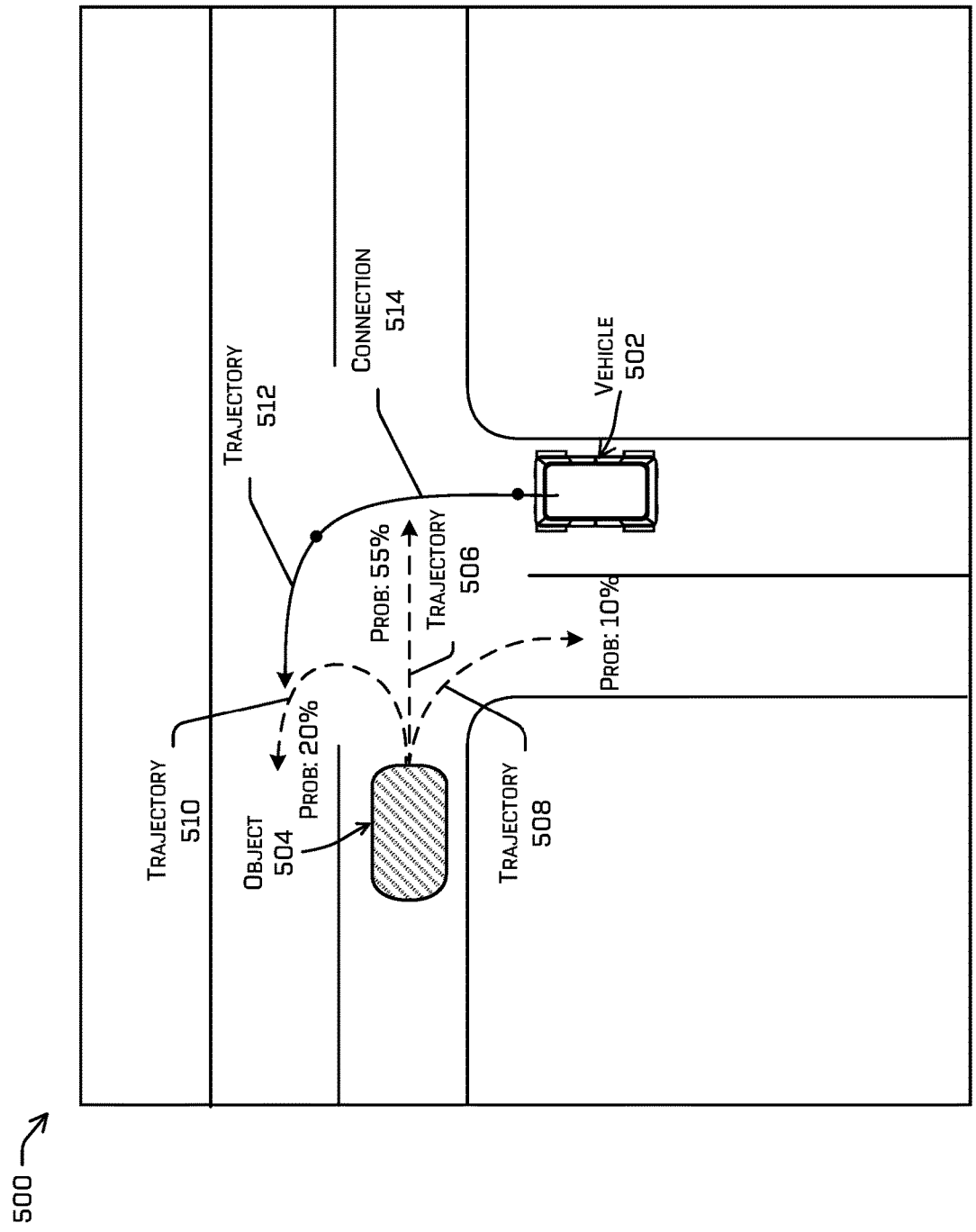
FIG. 5 illustrates an example environment, in which a guidance system of an autonomous vehicle updates a precomputed cost associated with a trajectory based at least in part on an object state of a detected object.

FIG. 5 illustrates an example environment 500, in which a guidance system of an autonomous vehicle 502 updates a precomputed cost associated with a trajectory based at least in part on an object state of a detected object.

As depicted in FIG. 5, the autonomous vehicle 502 may operate in the environment 500 following a trajectory 512. As the autonomous vehicle 502 approaches a crossroads prior to making a left turn to enter a first lane, a guidance system of the vehicle 502 may receive, from a sensor associated with the autonomous vehicle 502, sensor data representing an object 504 in a second lane adjacent to the first lane.

The guidance system may determine, based on the sensor data, an object state of the object 504 in the environment 500. For example, the guidance system may determine, based on the sensor data, that the object 504 is a moving vehicle. The guidance system may determine, based at least in part on the object 504 and a lattice, one or more potential trajectories associated with the object 504. As illustrated in FIG. 5, the guidance system of the autonomous vehicle 502 may determine potential trajectories 506, 508, and 510 associated with the object based at least in part on the lattice. Each of the potential trajectories may be associated with a precomputed collision probability indicating a probability of a collision between the autonomous vehicle 502 and the object 504. For example, the potential trajectory 506 may be a straight-line trajectory and may be associated with a 55% precomputed collision probability. As another example, the potential trajectory 508 may be a right-turning trajectory and may be associated with a 10% precomputed collision probability. As another example, the potential trajectory 510 may be a left-turning trajectory and may be associated with a 20% precomputed collision probability.

The trajectory 512 of the vehicle 502 may comprise a connection 514. The connection 514 may be associated with one or more conditional costs. The one or more conditional costs may represent a plurality of collision probabilities associated with potential trajectories 506, 508, and 510 of the object 504. For instance, the connection 514 may be associated with a first conditional cost representing the precomputed collision probability associated with the straight-line trajectory 506 of the object 504, a second conditional cost representing the precomputed collision probability associated with the right-turning trajectory 508 of the object 504, and a third conditional cost representing the precomputed collision probability associated with the left-turning trajectory 510 of the object 504.

The guidance system may determine, based at least in part on the sensor data, an object state associated with the object 504. The guidance system may further modify, based on the object state and as an updated cost, a precomputed cost associated with the trajectory 512. For example, the guidance system may determine, based on the sensor data, a light indication indicating a left turn of the object 504. The guidance system may determine, based on the light indication associated with the object 504, the third conditional cost representing the precomputed collision probability associated with the left-turning trajectory 510 of the object 504 from the one or more conditional costs associated with the connection 514. The guidance system may further modify a precomputed cost associated with the trajectory 512 based on the third conditional cost.

Figure 6A:
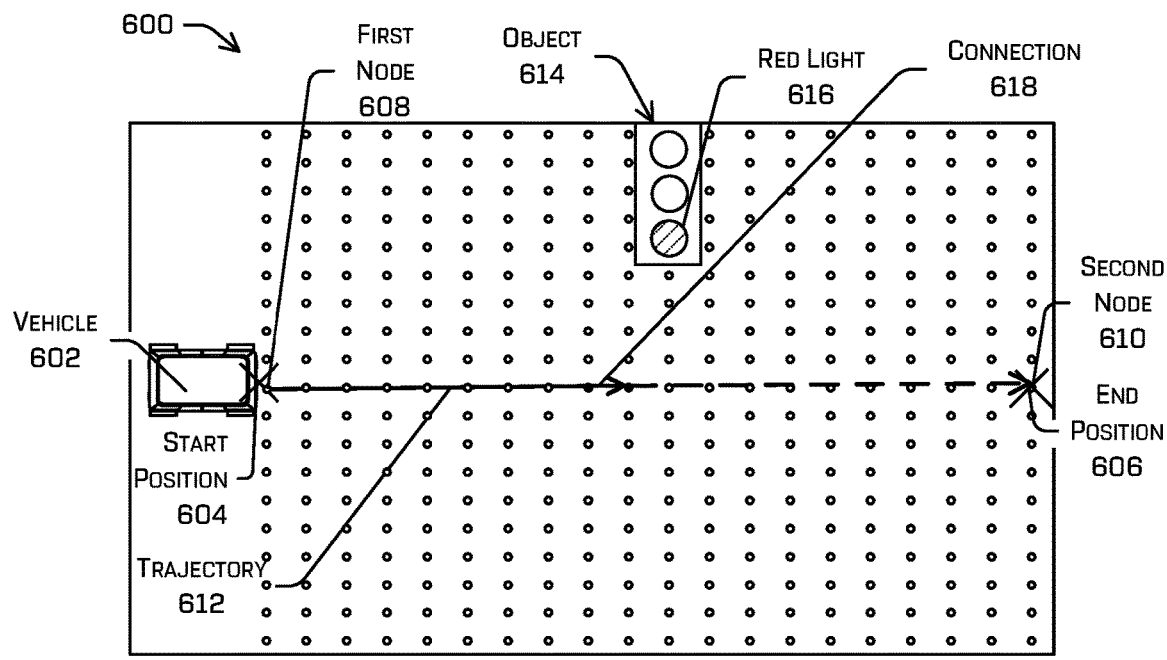
FIGS. 6A and 6B illustrate an example environment, in which a guidance system of an autonomous vehicle updates a precomputed cost associated with a trajectory based at least in part on an object state of a detected object.
Figure 6B:
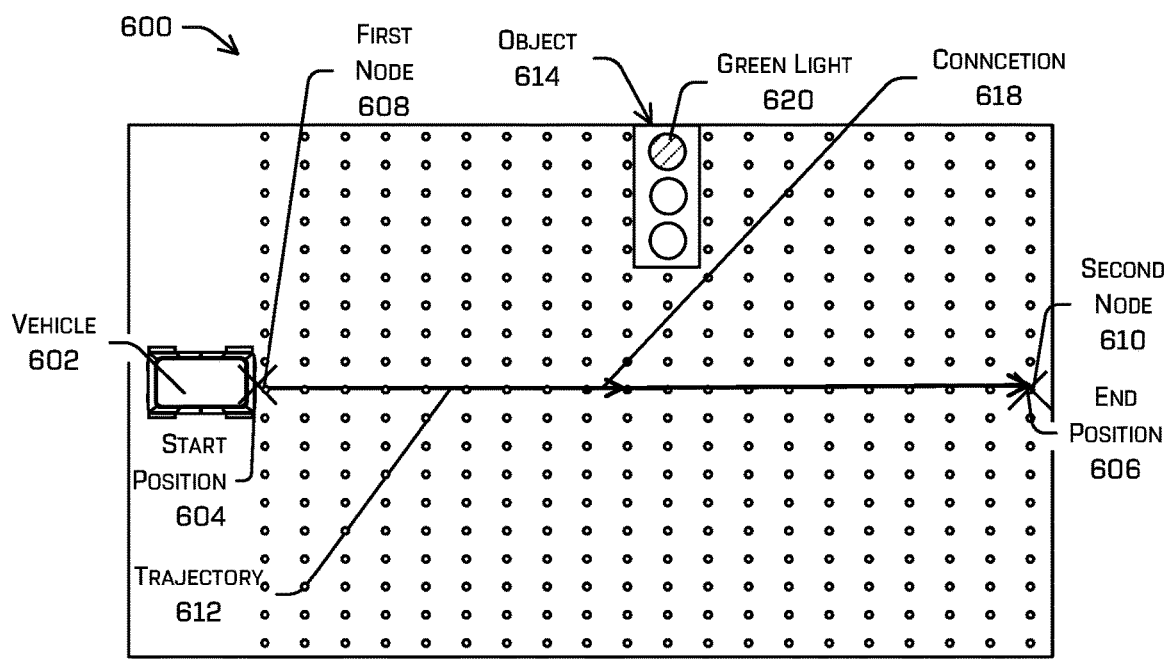

FIGS. 6A and 6B illustrate an example environment, in which a guidance system of an autonomous vehicle updates a precomputed cost associated with a trajectory based at least in part on an object state of a detected object.

As depicted in FIG. 6A, an autonomous vehicle 602 may operate in the environment 600. A guidance system of the autonomous vehicle 602 may receive a route to navigate from a start position 604 to an end position 606 in the environment 600. The guidance system of the autonomous vehicle 602 may receive, based on the route, map data representing a portion of the environment 600 along the route. The map data may include a lattice comprising a plurality of nodes and a plurality of connections between the plurality of nodes. A first node 608 of the plurality of nodes is associated with a first state of the autonomous vehicle 602, and a second node 610 of the plurality of nodes is associated with a second state of the autonomous vehicle 602. The lattice may further include a plurality of trajectories (not shown in FIG. 6A) through the environment 600. A set of trajectories of the plurality of trajectories may represent feasible transitions between the first node 608 and the second node 610. As depicted in FIG. 6A, the set of trajectories of the plurality of trajectories may include a trajectory 612 representing a feasible transition between the first node 608 and the second node 610. As depicted in FIG. 6A, a set of connections may be included in the trajectory 612.

As the autonomous vehicle 602 approaches an intersection, a guidance system of the vehicle 602 may receive, from a sensor associated with the autonomous vehicle 602, sensor data representing an object 614 (e.g., a traffic control device). The guidance system may determine, based at least in part on the object 614 and a lattice, one or more states associated with the object 614. For example, the object 614 may be associated with a red-light state and a green-light state. Each of the states may be associated with a precomputed progress cost. For example, the red-light state may be associated with a relatively high precomputed progress cost, and the green-light state may be associated with a relatively low precomputed progress cost.

The trajectory 612 of the vehicle 602 may comprise a connection 618. The connection 618 may be associated with one or more conditional costs. The one or more conditional costs may represent a plurality of precomputed progress costs associated with the one or more states of the object 614. For instance, the connection 618 may be associated with a first conditional cost representing a relatively high precomputed progress cost associated with the red-light state of the object 614 and a second conditional cost representing a relatively low precomputed progress cost associated with the green-light state of the object 614.

The guidance system may determine, based at least in part on the sensor data, an object state associated with the object 614. The guidance system may further modify, based on the object state and as an updated cost, a precomputed cost associated with the trajectory 612. For example, the guidance system may determine, based on the sensor data, a light indication indicating a red-light state 616 associated with the object 614. The red-light state 616 indicates that the object 614 (e.g., a traffic control device) does not allow traffic to proceed along a direction associated with the connection 618. The guidance system may determine, based on the light indication associated with the object 614, the first conditional cost representing the relatively high precomputed progress cost associated with the red-light state of the object 614 from the one or more conditional costs associated with the connection 618. The guidance system may further modify a precomputed cost associated with the trajectory 612 based on the first conditional cost.

The guidance system may further determine, based at least in part on the updated cost, whether to utilize the trajectory 612. In the particular example shown in FIG. 6A, the guidance system may determine not to follow the trajectory 612 based on the updated cost associated with the trajectory 612.

In another example, as depicted in FIG. 6B, the guidance system may determine, based on the sensor data, a light indication indicating a green-light state 620 associated with the object 614. The green-light state 620 indicates that the object 614 (e.g., a traffic control device) allows traffic to proceed along a direction associated with the connection 618. The guidance system may determine, based on the light indication associated with the object 614, the second conditional cost representing the relatively low precomputed progress cost associated with the green-light state of the object 614 from the one or more conditional costs associated with the connection 618. The guidance system may further modify the precomputed cost associated with the trajectory 612 based on the second conditional cost.

The guidance system may further determine, based at least in part on the updated cost, whether to utilize the trajectory 612. In the particular example shown in FIG. 6B, the guidance system may determine to follow the trajectory 612 based on the updated cost associated with the trajectory 612.

Figure 7:
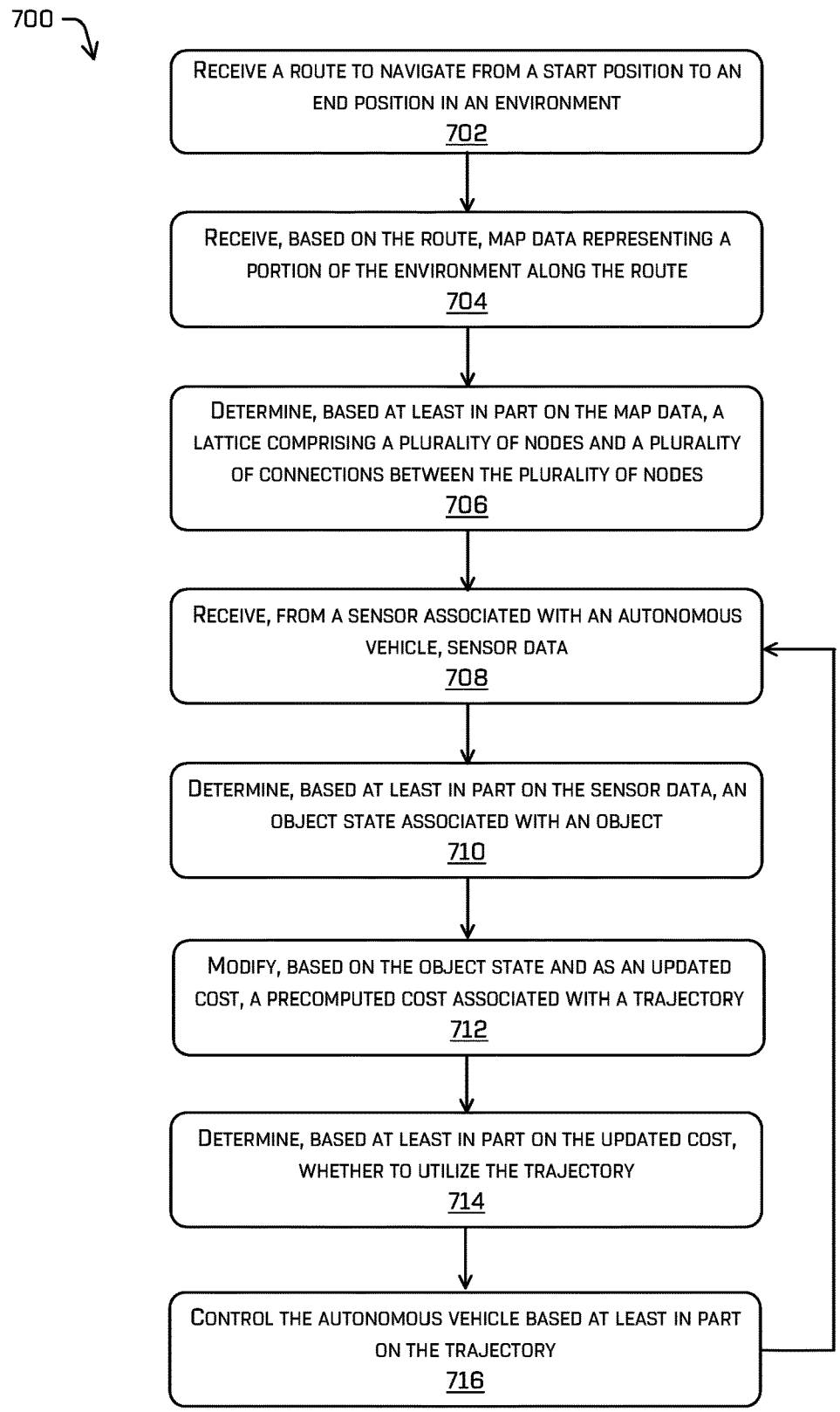
FIG. 7 illustrates a flow diagram of an example process for generating a trajectory for controlling an autonomous vehicle based on a lattice.

FIG. 7 illustrates a flow diagram of an example process 700 for generating a trajectory for controlling an autonomous vehicle. Some or all of the process 700 may be performed by one or more components in FIG. 1 and/or FIG. 2, as described herein. For example, some or all of process 700 may be performed by the autonomous vehicle 102, the planner 108, and/or the autonomous vehicle 202. Further, any of the operations described in the example process 700 may be executed in parallel, in a different order than depicted in the process 700, omit any of the operations of the depicted process 700, and/or be combined with any of the operations discussed herein.

At operation 702, the process 700 can include receiving a route to navigate from a start position to an end position in an environment. In some examples, the start position may be determined from sensor data received from one or more sensor(s) (e.g., a global positioning sensor (GPS), lidar, radar, cameras) of the autonomous vehicle, and end position may be received as part of a mission (e.g., from a passenger, from a command center).

At operation 704, the process 700 can include receiving, based on the route, map data representing a portion of the environment along the route.

At operation 706, the process 700 can include determining, based at least in part on the map data, a lattice comprising a plurality of nodes and a plurality of connections between the plurality of nodes. In some examples, the plurality of nodes and/or the plurality of connections may be indicative of a state of the vehicle, including one or more of a position, orientation, heading, steering angle, velocity, angular rate, acceleration, or the like. For example, a first node of the plurality of nodes may be associated with a first state of the autonomous vehicle, and a second node of the plurality of nodes may be associated with a second state of the autonomous vehicle. The plurality of connections may represent various feasible transitions between the nodes. The lattice comprises a plurality of trajectories through the environment. For example, a set of connections of the plurality of connections may represent a kinematically feasible trajectory from the first node to the second node. In various examples, a first node may be selected (and others proximate to the vehicle may be discarded or disregarded) based on a current state of the vehicle.

In some examples, a trajectory of the plurality of trajectories included in the lattice may be associated with a precomputed cost. The precomputed cost associated with a trajectory may be determined based on one or more progression cost metrics and/or one or more comfort metrics. The progression cost metrics may include a number of lane changes associated with the trajectory, a time associated with the trajectory, a distance associated with the trajectory, a number of stop signs associated with the trajectory, etc. The comfort metrics may include jerk parameters associated with the trajectory, curvature parameters associated with the trajectory, pavement parameters associated with the trajectory, accelerations associated with the trajectory, etc.

In some examples, the first state of the autonomous vehicle may include position data of the first node in the environment and at least one or more acceleration data, velocity data, or yaw rate data associated with the autonomous vehicle. The second state of the autonomous vehicle may include position data of the second node in the environment. The guidance system of the autonomous vehicle may determine, based at least in part on the lattice, a kinematically feasible trajectory between the first node and the second node. As described above, the kinematically feasible trajectory between the first node and the second node may be associated with a precomputed cost.

At operation 708, the process 700 can include receiving, from a sensor associated with the vehicle, sensor data. The sensor data may represent an object in the environment. Examples of the sensor may include, but are not limited to, a camera, an ultrasonic sensor to acoustically detect the object in the environment, a lidar sensor, a radar sensor, etc. In some examples, the sensor may be mounted or coupled with the vehicle, while in some examples, the sensor can be remote from the vehicle.

At operation 710, the process 700 can include determining, based at least in part on the sensor data, an object state associated with an object. The object includes a dynamic object or a traffic control device.

In some examples, the object includes a dynamic object (e.g., a moving vehicle). The process 700 can include determining a connection of a set of connections based on the dynamic object, where the set of connections represents the kinematically feasible trajectory from the first node to the second node. The process 700 can include determining, based on the object state associated with the dynamic object, a conditional cost of a plurality of conditional costs associated with the connection. The plurality of conditional costs may represent a plurality of precomputed collision probabilities associated with a plurality of trajectory of the dynamic object. For instance, the dynamic object may be associated with a potential straight-line trajectory, a potential left-turning trajectory, and a potential right-turning trajectory. A connection may be associated with a first conditional cost representing a precomputed collision probability associated with the straight-line trajectory of the dynamic object, a second conditional cost representing a precomputed collision probability associated with the left-turning trajectory of the dynamic object, and a third conditional cost representing a precomputed collision probability associated with the right-turning trajectory of the dynamic object.

In some examples, the object includes a traffic control device. The process 700 can include determining a connection of a set of connections based on the traffic control device, where the set of connections represents the kinematically feasible trajectory from the first node to the second node. The process 700 can include determining, based on a state associated with the traffic control device, a conditional cost of a plurality of conditional costs associated with the connection. The plurality of conditional costs may represent a plurality of precomputed progress costs associated with a plurality of states. For instance, a traffic control device (e.g., a traffic light) may be associated with a red-light state and a green-light state. The connection may be associated with a first conditional cost representing a relatively high precomputed progress cost associated with the red-light state and a second conditional cost representing a relatively low precomputed progress cost associated with green-light state.

At operation 712, the process 700 can include modifying, based on the object state and as an updated cost, the precomputed cost associated with the kinematically feasible trajectory between the first node and the second node. For example, the process 700 can include determining, based on the object and the lattice, a connection of the set of connections included in the kinematically feasible trajectory between the first node and the second node. The process 700 can include determining, based on the object state associated with the object, a conditional cost of a plurality of conditional costs associated with the connection. The process 700 can further include modifying, based at least in part on the conditional cost and as the updated cost, the precomputed cost associated with the kinematically feasible trajectory between the first node and the second node.

In some examples, the process 700 can include may determining, based on the lattice, one or more trajectories associated with the connection. The guidance system may further update, based at least in part on the conditional cost associated with the connection and as one or more updated costs, one or more precomputed costs associated with the one or more trajectories.

At operation 714, the process 700 can include determining, based on the updated cost, whether to utilize the kinematically feasible trajectory between the first node and the second node cost data associated with a trajectory. As above, such a trajectory may be further refined by one or more further components.

At operation 716, the process 700 can include controlling the autonomous vehicle based at least in part on the trajectory.

Figure 8:
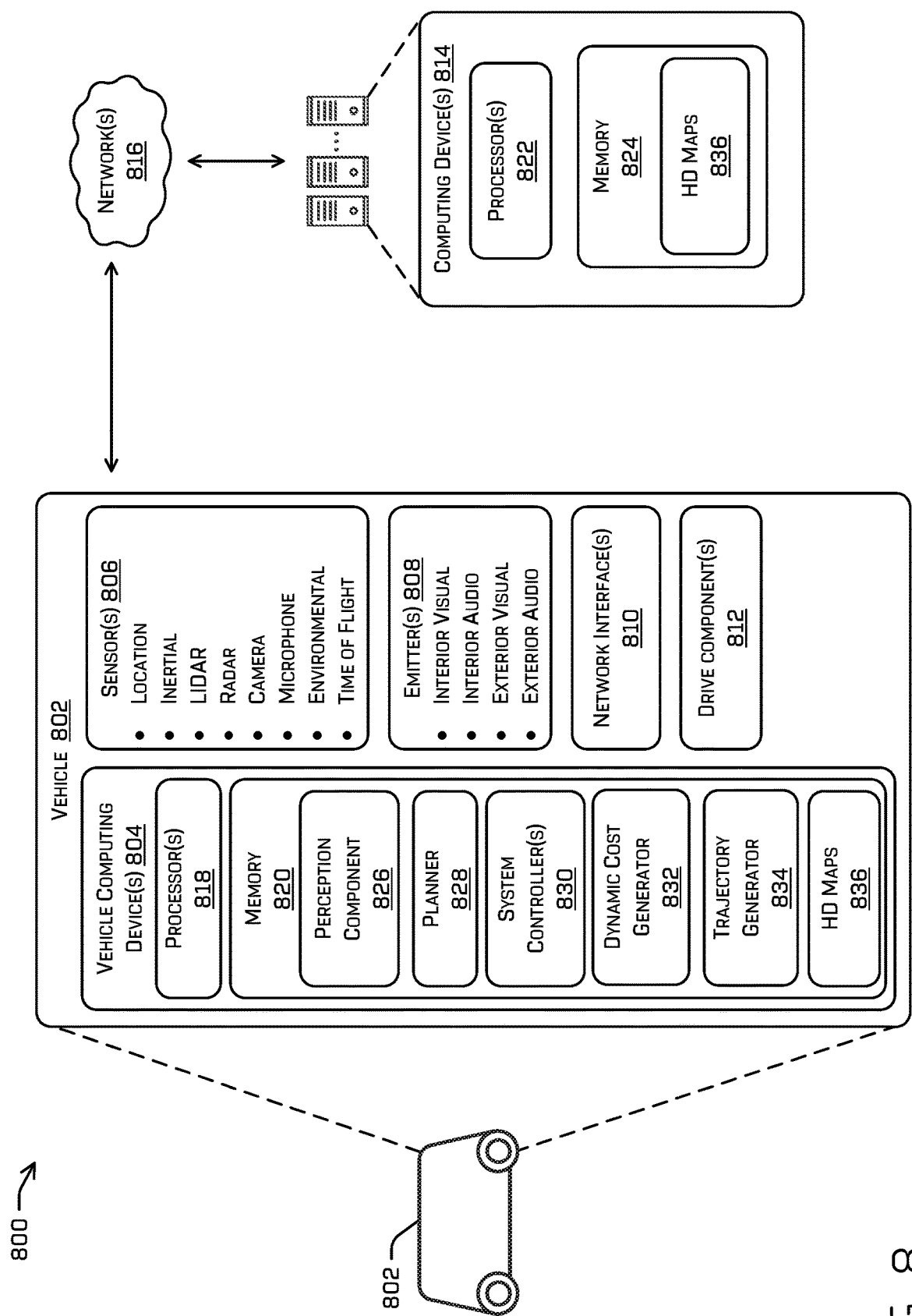
FIG. 8 is a block diagram of an example system for implementing the techniques described herein.

FIG. 8 illustrates a block diagram of an example system that implements the techniques discussed herein. In some instances, the system 800 may include a vehicle 802, which may correspond to the autonomous vehicle 102 in FIG. 1 and/or the autonomous vehicle 202 in FIG. 2.

The vehicle 802 may include a vehicle computing device 804, one or more sensor(s) 806, one or more emitters 808, one or more network interfaces 810, and/or one or more drive components 812.

In some instances, the sensor(s) 806 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., camera, e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 806 may include multiple instances of each of these or other types of sensors. For instance, the lidar sensors may include individual lidar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device 804.

The vehicle 802 may also include emitter(s) 808 for emitting light and/or sound. The emitter(s) 808 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include the network interface(s) 810 that enable communication between the vehicle 802 and one or more other local or remote computing device(s). For instance, the network interface(s) 810 may facilitate communication with other local computing device(s) on the vehicle 802 and/or the drive component(s) 812. Also, the network interface (s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with a computing device(s) 814. In some examples, the computing device(s) 814 may comprise one or more nodes of a distributed computing system (e.g., a cloud computing architecture).

The network interface(s) 810 may include physical and/or logical interfaces for connecting the vehicle computing device 804 to another computing device or a network, such as network(s) 816. For example, the network interface(s) 810 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 804 and/or the sensor(s) 806 may send sensor data, via the network(s) 816, to the computing device(s) 814 at a particular frequency, after a lapse of a predetermined period of time, in near real-time, etc.

In some instances, the vehicle 802 may include one or more drive components 812. In some instances, the vehicle 802 may have a single drive component 812. In some instances, the drive component(s) 812 may include one or more sensor(s) to detect conditions of the drive component(s) 812 and/or the surroundings of the vehicle 802. By way of example and not limitation, the sensor(s) of the drive component(s) 812 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the environment, lidar sensors, radar sensors, etc. Some sensors, such as the wheel encoders, may be unique to the drive component(s) 812. In some cases, the sensor(s) on the drive component(s) 812 may overlap or supplement corresponding systems of the vehicle 802 (e.g., sensor(s) 806).

The drive component(s) 812 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, a heating, ventilation and air conditioning (HVAC) system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 812 may include a drive component controller which may receive and preprocess data from the sensor(s) and control operation of the various vehicle systems. In some instances, the drive component controller may include one or more processors and a memory communicatively coupled with the one or more processors. The memory may store one or more components to perform various functionalities of the drive component(s) 812. Furthermore, the drive component(s) 812 may also include one or more communication connection(s) that enable communication by the respective drive component with one or more other local or remote computing device(s).

The vehicle computing device 804 may include one or more processors, processor(s) 818, and memory 820 communicatively coupled with the one or more processors 818. Computing device(s) 814 may additionally or alternatively include processor(s) 822, and/or memory 824. The processor(s) 818 and/or 822 may be any suitable processor capable of executing instructions to process data and perform operations as described herein. By way of example and not limitation, the processor(s) 818 and/or 822 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 820 and/or 824 may be examples of non-transitory computer-readable media. The memory 820 and/or 824 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 820 may store a perception component 826, which may represent perception component 106, and/or a planner 828, which may represent planner 108, either or both of which may comprise hardware, software, or some combination thereof. Memory 820 may additionally or alternatively store one or more system controller(s) 830 (which may additionally or alternatively be implemented as hardware), which may be configured to control steering, propulsion, braking, safety, emitters, communication, and other systems of the vehicle 802. These system controller(s) 830 may communicate with and/or control corresponding systems of the drive component(s) 812 and/or other components of the vehicle 802. For example, a planner may generate instructions for controlling vehicle 802 based at least in part on an output of perception component 826 and/or planner 828, such as a path, and transmit the instructions to the system controller(s) 830, which may control operation of the vehicle 802 based at least in part on the instructions.

In some instances, the memory 820 and/or memory 824 may store one or more HD maps 836, which may represent HD maps 218. In some examples, memory 824 may additionally or alternatively store a dynamic cost generator 832 and/or a trajectory generator 834. In some examples, the dynamic cost generator 832 and/or the trajectory generator 834 may comprise a machine-learned (ML) model (e.g., a neural network) and/or a parallel processing component.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BBN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, Visual Geometry Group (VGG), DenseNet, PointNet, and the like.

It should be noted that while FIG. 8 is illustrated as a distributed system, in alternative examples, components of the vehicle 802 may be associated with the computing device(s) 814, and/or components of the computing device (s) 814 may be associated with the vehicle 802. That is, the vehicle 802 may perform one or more of the functions associated with the computing device(s) 814, and vice versa.

Example Clauses

A: A system comprising: one or more processors; and one or more computer-readable media storing instructions executable by the one or more processors, wherein the instructions, when executed, cause the system to perform operations comprising: receiving a route to navigate from a start position to an end position in an environment; receiving, based on the route, map data representing a portion of the environment along the route; determining, based at least in part on the map data, a lattice comprising a plurality of nodes and a plurality of connections between the plurality of nodes, a first node of the plurality of nodes is associated with a first state of an autonomous vehicle, a second node of the plurality of nodes is associated with a second state of the autonomous vehicle, and a set of connections of the plurality of connections represents a kinematically feasible trajectory between the first node and the second node, wherein the kinematically feasible trajectory is associated with a precomputed cost; receiving, from a sensor associated with the autonomous vehicle, sensor data; determining, based at least in part on the sensor data, an object state associated with an object; modifying, based on the object state and as an updated cost, the precomputed cost associated with the kinematically feasible trajectory; determining, based at least in part on the updated cost, whether to utilize the kinematically feasible trajectory; and controlling the autonomous vehicle based at least in part on the kinematically feasible trajectory.

B: The system of paragraph A, wherein the map data further comprises area information of the autonomous vehicle associated with the first node, the second node, and the plurality of connections, the operations further comprising: determining, based at least in part on the area information associated with the autonomous vehicle following the kinematically feasible trajectory, a collision probability of a collision between the autonomous vehicle and the object, and wherein the precomputed cost is determined based at least in part on the collision probability.

C: The system of paragraph A or B, wherein the object comprises a dynamic object, the operations further comprising: determining a connection of the set of connections associated with the dynamic object; and determining, based on the object state associated with the dynamic object, a conditional cost of a plurality of conditional costs associated with the connection, wherein the plurality of conditional costs represents a plurality of precomputed collision probabilities associated with a plurality of trajectory of the dynamic object, and wherein modifying the precomputed cost associated with the kinematically feasible trajectory comprises modifying, based on the conditional cost and as the updated cost, the precomputed cost associated with the kinematically feasible trajectory.

D: The system of any of paragraphs A-C, wherein the object comprises a traffic control device, the operations further comprising: determining that the traffic control device is associated with a connection of the set of connections; and wherein the object state indicates whether the traffic control device allows traffic to proceed along a direction associated with the connection, and wherein determining the updated cost is based at least in part on conditional cost associated with a state associated with the traffic control device.

E: The system of any of paragraphs A-D, the operations further comprising: determining a connection of the set of connections associated with the object; determining, based on the object state associated with the object, a conditional cost of a plurality of conditional cost associated with the connection; determining, based on the lattice, a trajectory associated with the connection; and backpropagating, based at least in part on the conditional cost associated with the connection and as one or more updated costs, one or more precomputed costs associated with the trajectory in a direction towards the autonomous vehicle.

F: The system of any of paragraphs A-E, wherein the precomputed cost associated with the kinematically feasible trajectory is determined based at least in part on: a comfort metric comprising one or more of a jerk parameter associated with the kinematically feasible trajectory, a curvature parameter associated with the kinematically feasible trajectory, a pavement parameter associated with the kinematically feasible trajectory, or an acceleration associated with the kinematically feasible trajectory; or a progression cost comprising one or more of a number of lane changes associated with the kinematically feasible trajectory, a time associated with the kinematically feasible trajectory, a number of stop signs associated with the kinematically feasible trajectory, or a distance associated with the kinematically feasible trajectory.

G: One or more non-transitory computer-readable media storing instructions executable by one or more processors, wherein the instructions, when executed, cause the one or more processors to perform operations comprising: receiving a route to navigate from a start position to an end position in an environment; receiving, based on the route, map data representing a portion of the environment; receiving a lattice comprising a plurality of nodes and a plurality of connections between the plurality of nodes, a first node of the plurality of nodes is associated with a first state of a vehicle, a second node of the plurality of nodes is associated with a second state of the vehicle, and a set of connections of the plurality of connections represents a kinematically feasible trajectory between the first node and the second node, wherein the kinematically feasible trajectory is associated with a precomputed cost; receiving, from a sensor associated with the vehicle, sensor data; determining, based at least in part on the sensor data, an object state associated with an object; modifying, based on the object state and as an updated cost, the precomputed cost associated with the kinematically feasible trajectory; determining, based at least in part on the updated cost, whether to utilize the kinematically feasible trajectory; and controlling the vehicle based at least in part on the kinematically feasible trajectory.

H: The one or more non-transitory computer-readable media of paragraph G, wherein the lattice is associated with area information indicative of an area covered by the vehicle traversing the connections between the nodes, the operations further comprising: determining, based at least in part on the area information associated with the vehicle following the kinematically feasible trajectory, a collision probability of a collision between the vehicle and the object, and wherein the precomputed cost is determined based at least in part on the collision probability.

I: The one or more non-transitory computer-readable media of paragraph G or H, wherein the object comprises a dynamic object, the operations further comprising: determining a connection of the set of connections associated with the dynamic object; and determining, based on the object state associated with the dynamic object, a conditional cost associated with the connection representing a collision probability associated with the dynamic object, and wherein modifying the precomputed cost associated with the kinematically feasible trajectory comprises modifying, based on the conditional cost and as the updated cost, the precomputed cost associated with the kinematically feasible trajectory.

J: The one or more non-transitory computer-readable media of any of paragraphs G-I, wherein object comprises a traffic control device, the operations further comprising: determining a connection of the set of connections associated with the traffic control device; and determining, based on a state associated with the traffic control device, a conditional cost, wherein the state indicates whether the traffic control device allows traffic to proceed along a direction associated with the connection and determining the updated cost is further based at least in part on the conditional cost.

K: The one or more non-transitory computer-readable media of any of paragraphs G-J, the operations further comprising: determining a connection of the set of connections; determining, based on the object state associated with the object, a conditional cost; determining, based on the lattice, a trajectory associated with the connection, wherein determining the updated cost comprises backpropagating the conditional cost.

L: The one or more non-transitory computer-readable media of any of paragraphs G-K, wherein the precomputed cost associated with the kinematically feasible trajectory is determined based at least in part on: a comfort metric determined based at least in part on one or more of a jerk parameter associated with the kinematically feasible trajectory, a curvature parameter associated with the kinematically feasible trajectory, a pavement parameter associated with the kinematically feasible trajectory, or an acceleration associated with the kinematically feasible trajectory; or a progression cost determined based at least in part on one or more of a number of lane changes associated with the kinematically feasible trajectory, a time associated with the kinematically feasible trajectory, a number of stop signs associated with the kinematically feasible trajectory, or a distance associated with the kinematically feasible trajectory.

M: The one or more non-transitory computer-readable media of any of paragraphs G-L, wherein the first state of the vehicle comprises position data of the first node in the environment and at least one or more of: acceleration data; velocity data; or yaw rate data.

N: A method comprising: receiving a route for a vehicle to navigate from a start position to an end position in an environment; receiving a lattice comprising a plurality of nodes and a plurality of connections between the plurality of nodes associated with the route, a first node of the plurality of nodes is associated with a first state of the vehicle, a second node of the plurality of nodes is associated with a second state of the vehicle, and a set of connections of the plurality of connections represents a kinematically feasible trajectory between the first node and the second node, wherein the kinematically feasible trajectory is associated with a precomputed cost; receiving, from a sensor associated with the vehicle, sensor data; determining, based at least in part on the sensor data, an object state associated with an object; modifying, based on the object state and as an updated cost, the precomputed cost associated with the kinematically feasible trajectory; determining, based at least in part on the updated cost, whether to utilize the kinematically feasible trajectory; and controlling the vehicle based at least in part on the kinematically feasible trajectory.

O: The method of paragraph N, wherein the lattice is associated with area information of the vehicle associated with the first node, the second node, and the plurality of connections, the method further comprising: determining, based at least in part on the area information, a collision probability of a collision between the vehicle and the object, wherein the updated cost is determined based at least in part on the collision probability.

P: The method of paragraph N or O, wherein the object comprises a dynamic object, the method further comprising: determining a connection of the set of connections associated with the dynamic object; and determining, based on the object state associated with the dynamic object, a conditional cost associated with a probability of collision between the vehicle and the object, wherein the updated cost is based at least in part on the conditional cost.

Q: The method of any of paragraphs N-P, wherein object comprises a traffic control device, the method further comprising: determining a connection of the set of connections associated with the traffic control device; and determining a state associated with the traffic control device, the state indicates whether the traffic control device allows traffic to proceed along a direction associated with the connection; and determining, based on the state associated with the traffic control device, a conditional cost, wherein determining the updated cost is based at least in part on the conditional cost.

R: The method of any of paragraphs N-Q, further comprising: determining a connection of the set of connections associated with the object; and determining, based on the object state associated with the object, a conditional cost, wherein determining the updated cost comprises backpropagating the conditional cost.

S: The method of paragraphs N-R, wherein the precomputed cost associated with the kinematically feasible trajectory is determined based at least in part on: a comfort cost determined based at least in part on one or more of a jerk parameter associated with the kinematically feasible trajectory, a curvature parameter associated with the kinematically feasible trajectory, a pavement parameter associated with the kinematically feasible trajectory, or an acceleration associated with the kinematically feasible trajectory; or a progression cost determined based at least in part on one or more of a number of lane changes associated with the kinematically feasible trajectory, a time associated with the kinematically feasible trajectory, a number of stop signs associated with the kinematically feasible trajectory, or a distance associated with the kinematically feasible trajectory.

T: The method of paragraphs N-S, wherein the first state of the vehicle comprises position data of the first node in the environment and at least one or more of: acceleration data; velocity data; or yaw rate data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      receiving a route to navigate from a start position to an end position in an environment;
      receiving, prior to an autonomous vehicle navigating the route and based at least in part on the route, precomputed map data representing a portion of the environment along the route;
      determining, based at least in part on the precomputed map data, a lattice comprising a plurality of nodes and a plurality of connections between the plurality of nodes, a first node of the plurality of nodes is associated with a first state of the autonomous vehicle, a second node of the plurality of nodes is associated with a second state of the autonomous vehicle, and a set of connections of the plurality of connections represents a kinematically feasible trajectory between the first node and the second node, wherein:
         the kinematically feasible trajectory is associated with a precomputed cost associated with the precomputed map data, and
         the lattice is generated by a lattice generator comprising a spatial state lattice generator and a spatiotemporal conformal state lattice generator configured to receive one or more spatial state lattices and to generate the lattice;
      receiving, from a sensor associated with the autonomous vehicle, sensor data;
      determining, based at least in part on the sensor data, an object state associated with an object;
      modifying, based on the object state and as an updated cost including a comfort metric and a progression cost, the precomputed cost associated with the kinematically feasible trajectory, wherein:
         the comfort metric comprises a pavement parameter associated with the kinematically feasible trajectory, and
         the progression cost comprises a number of stop signs associated with the kinematically feasible trajectory;
      determining, based at least in part on the updated cost, whether to utilize the kinematically feasible trajectory; and
      controlling the autonomous vehicle based at least in part on the kinematically feasible trajectory.

2. The system of claim 1, wherein the precomputed map data further comprises area information of the autonomous vehicle associated with the first node, the second node, and the plurality of connections, the operations further comprising:
   determining, based at least in part on the area information associated with the autonomous vehicle following the kinematically feasible trajectory, a collision probability of a collision between the autonomous vehicle and the object,
   wherein the precomputed cost is determined based at least in part on the collision probability.

3. The system of claim 1, wherein the object comprises a dynamic object, the operations further comprising:
   determining a connection of the set of connections associated with the dynamic object; and
   determining, based on the object state associated with the dynamic object, a conditional cost of a plurality of conditional costs associated with the connection,
   wherein the plurality of conditional costs represents a plurality of precomputed collision probabilities associated with a plurality of trajectory of the dynamic object, and
   wherein modifying the precomputed cost associated with the kinematically feasible trajectory comprises modifying, based on the conditional cost and as the updated cost, the precomputed cost associated with the kinematically feasible trajectory.

4. The system of claim 1, wherein the object comprises a traffic control device, the operations further comprising:
   determining that the traffic control device is associated with a connection of the set of connections;

wherein the object state indicates whether the traffic control device allows traffic to proceed along a direction associated with the connection, and wherein determining the updated cost is based at least in part on conditional cost associated with a state associated with the traffic control device.

5. The system of claim 1, the operations further comprising:
   determining a connection of the set of connections associated with the object;
   determining, based on the object state associated with the object, a conditional cost of a plurality of conditional cost associated with the connection;
   determining, based on the lattice, a trajectory associated with the connection; and
   backpropagating, based at least in part on the conditional cost associated with the connection and as one or more updated costs, one or more precomputed costs associated with the trajectory in a direction towards the autonomous vehicle.

6. The system of claim 1, wherein the spatial state lattice generator is configured to generate, based at least in part on the precomputed map data, the first state of the autonomous vehicle, and the second state of the autonomous vehicle, the one or more spatial state lattices.

7. One or more non-transitory computer-readable media storing instructions executable by one or more processors, wherein the instructions, when executed, cause the one or more processors to perform operations comprising:
   receiving a route to navigate from a start position to an end position in an environment;
   receiving, based on the route, precomputed map data representing a portion of the environment;
   receiving a lattice comprising a plurality of nodes and a plurality of connections between the plurality of nodes, a first node of the plurality of nodes is associated with a first state of a vehicle, a second node of the plurality of nodes is associated with a second state of the vehicle, and a set of connections of the plurality of connections represents a kinematically feasible trajectory between the first node and the second node, wherein the kinematically feasible trajectory is associated with a precomputed cost associated with the precomputed map data, wherein:
      the plurality of nodes of the lattice are regularly spaced, and
      wherein the lattice is generated by a lattice generator comprising a spatial state lattice generator and a spatiotemporal conformal state lattice generator configured to receive one or more spatial state lattices and to generate the lattice;
   receiving, from a sensor associated with the vehicle, sensor data;
   determining, based at least in part on the sensor data, an object state associated with an object;
   modifying, based on the object state and as an updated cost including a comfort metric and a progression cost, the precomputed cost associated with the kinematically feasible trajectory, wherein:
      the comfort metric comprises a pavement parameter associated with the kinematically feasible trajectory, and
      the progression cost comprises a number of stop signs associated with the kinematically feasible trajectory;
   determining, based at least in part on the updated cost, whether to utilize the kinematically feasible trajectory; and
   controlling the vehicle based at least in part on the kinematically feasible trajectory.

8. The one or more non-transitory computer-readable media of claim 7, wherein the lattice is associated with area information indicative of an area covered by the vehicle traversing the set of connections between the plurality of nodes, the operations further comprising:
   determining, based at least in part on the area information associated with the vehicle following the kinematically feasible trajectory, a collision probability of a collision between the vehicle and the object,
   wherein the precomputed cost is determined based at least in part on the collision probability.

9. The one or more non-transitory computer-readable media of claim 7, wherein the object comprises a dynamic object, the operations further comprising:
   determining a connection of the set of connections associated with the dynamic object;
   determining, based on the object state associated with the dynamic object, a conditional cost associated with the connection representing a collision probability associated with the dynamic object,
   wherein modifying the precomputed cost associated with the kinematically feasible trajectory comprises modifying, based on the conditional cost and as the updated cost, the precomputed cost associated with the kinematically feasible trajectory.

10. The one or more non-transitory computer-readable media of claim 7,
    wherein object comprises a traffic control device, the operations further comprising:
    determining a connection of the set of connections associated with the traffic control device; and
    determining, based on a state associated with the traffic control device, a conditional cost,
    wherein the state indicates whether the traffic control device allows traffic to proceed along a direction associated with the connection and determining the updated cost is further based at least in part on the conditional cost.

11. The one or more non-transitory computer-readable media of claim 7, the operations further comprising:
    determining a connection of the set of connections;
    determining, based on the object state associated with the object, a conditional cost; and
    determining, based on the lattice, a trajectory associated with the connection,
    wherein determining the updated cost comprises backpropagating the conditional cost.

12. The one or more non-transitory computer-readable media of claim 7, wherein the lattice is determined based at least in part on road geometry data associated with the portion of the environment along the route.

13. The one or more non-transitory computer-readable media of claim 12, wherein the road geometry data comprises at least one of a lane marking, a lane boundary, and a lane reference.

14. A method comprising:
    receiving a route for a vehicle to navigate from a start position to an end position in an environment;
    receiving, based at least in part on the route, precomputed map data;
    receiving a lattice from a lattice generator, the lattice comprising a plurality of nodes and a plurality of connections between the plurality of nodes associated with the route, a first node of the plurality of nodes is associated with a first state of the vehicle, a second node of the plurality of nodes is associated with a second state of the vehicle, and a set of connections of the plurality of connections represents a kinematically feasible trajectory between the first node and the second node, wherein the kinematically feasible trajectory is associated with a precomputed cost associated with the precomputed map data, wherein the precomputed cost is associated with at least one conditional cost from among multiple possible conditional costs associated with the set of connections, and wherein the lattice generator comprises a spatial state lattice generator and a spatiotemporal conformal state lattice generator configured to receive one or more spatial state lattices and to generate the lattice;

receiving, from a sensor associated with the vehicle, sensor data;

determining, based at least in part on the sensor data, an object state associated with an object;

modifying, based on the object state and as an updated cost including a comfort metric and a progression cost, the precomputed cost associated with the kinematically feasible trajectory, wherein:

the comfort metric comprises a pavement parameter associated with the kinematically feasible trajectory, and the progression cost comprises a number of stop signs associated with the kinematically feasible trajectory;

determining, based at least in part on the updated cost, whether to utilize the kinematically feasible trajectory; and controlling the vehicle based at least in part on the kinematically feasible trajectory.

15. The method of claim 14, wherein the lattice is associated with area information of the vehicle associated with the first node, the second node, and the plurality of connections, the method further comprising:

determining, based at least in part on the area information, a collision probability of a collision between the vehicle and the object, wherein the updated cost is determined based at least in part on the collision probability.

16. The method of claim 14, wherein the object comprises a dynamic object, the method further comprising:

determining a connection of the set of connections associated with the dynamic object; and determining, based on the object state associated with the dynamic object, a conditional cost associated with a probability of collision between the vehicle and the object, wherein the updated cost is based at least in part on the conditional cost.

17. The method of claim 14, wherein object comprises a traffic control device, the method further comprising:

determining a connection of the set of connections associated with the traffic control device;

determining a state associated with the traffic control device, the state indicates whether the traffic control device allows traffic to proceed along a direction associated with the connection; and determining, based on the state associated with the traffic control device, a conditional cost, wherein determining the updated cost is based at least in part on the conditional cost.

18. The method of claim 14, further comprising:

determining a connection of the set of connections associated with the object; and determining, based on the object state associated with the object, a conditional cost, wherein determining the updated cost comprises back-propagating the conditional cost.

19. The method of claim 14, wherein the first state of the vehicle comprises position data of the first node in the environment and at least one or more of:

acceleration data;

velocity data; or yaw rate data.

20. The method of claim 14, wherein the lattice is precomputed by and received from a remote computing resource.

* * * * *